United States Patent
Iwasaki

(10) Patent No.: US 9,127,939 B2
(45) Date of Patent: Sep. 8, 2015

(54) SHAPE MEASUREMENT METHOD FOR COMBINING PARTIAL MEASUREMENTS

(75) Inventor: Yasushi Iwasaki, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 706 days.

(21) Appl. No.: 13/355,715

(22) Filed: Jan. 23, 2012

(65) Prior Publication Data

US 2012/0191411 A1 Jul. 26, 2012

(30) Foreign Application Priority Data

Jan. 26, 2011 (JP) .................. 2011-014381

(51) Int. Cl.
*G01B 21/20* (2006.01)
*G06F 15/00* (2006.01)
*G01B 21/04* (2006.01)
*G01B 11/255* (2006.01)

(52) U.S. Cl.
CPC .............. *G01B 21/20* (2013.01); *G01B 11/255* (2013.01); *G01B 21/045* (2013.01)

(58) Field of Classification Search
CPC .... G01B 21/20; G01B 21/045; G01B 11/255; G01M 11/005; G01M 11/025
USPC ............... 702/58, 94, 95, 152, 153, 155, 158, 702/167, 168; 356/511, 512; 382/284
See application file for complete search history.

(56) References Cited

U.S. PATENT DOCUMENTS 6,956,657 B2   10/2005   Golini et al.
8,447,561 B2 *  5/2013   Negishi .......................... 702/167

* cited by examiner

*Primary Examiner* — John H Le
(74) *Attorney, Agent, or Firm* — Rossi, Kimms & McDowell LLP

(57) ABSTRACT

The present invention provides a stitch measurement method for making a plurality of partial measurements, and obtaining an overall shape by combining partial measurement results, including a step of dividing, on lattices, each peripheral partial measurement region including an external portion of an overall measurement region into a first region inside the overall measurement region and a second region outside the overall measurement region, and dividing each central partial measurement region which does not include any external portion of the overall measurement region into a first region and a second region according to division patterns of the peripheral partial measurement region, a step of formulating first orthogonal function sequences on the first regions, and a step of defining linear combinations of respective functions of the first orthogonal function sequences on the first regions as first system errors for the respective partial measurement regions on the overall measurement region.

7 Claims, 20 Drawing Sheets

FIG. 9

$W_0^0(x,y) = 1$ $W_1^0(x,y) = \dfrac{-4+3\pi x}{3\pi}$ $W_1^1(x,y) = y$ $W_2^0(x,y) = \dfrac{512 - 45\pi^2 - 144\pi x - 1280 x^2 + 180\pi^2 x^2}{20(-8+3\pi)(8+3\pi)}$ $W_2^1(x,y) = \dfrac{(-16+15\pi x)y}{15\pi}$ $W_2^2(x,y) = \dfrac{-1+x^2+3y^2}{3}$ $W_3^0(x,y) = \dfrac{-65536 + 6600\pi^2 + 79360\pi x - 7875\pi^3 x + 163840 x^2 - 18000\pi^2 x^2 - 152320\pi x^3 - 15750\pi^3 x^3}{70\pi(-2176 + 225\pi^2)}$ $W_3^1(x,y) = \dfrac{(2048 - 175\pi^2 - 800\pi x - 7168 x^2 + 1050\pi^2 x^2)y}{14(-512+75\pi^2)}$ $W_3^2(x,y) = \dfrac{(-32+35\pi x)(-1+x^2+3y^2)}{105\pi}$ $W_3^3(x,y) = \dfrac{(-3+3x^2+5y^2)y}{5}$

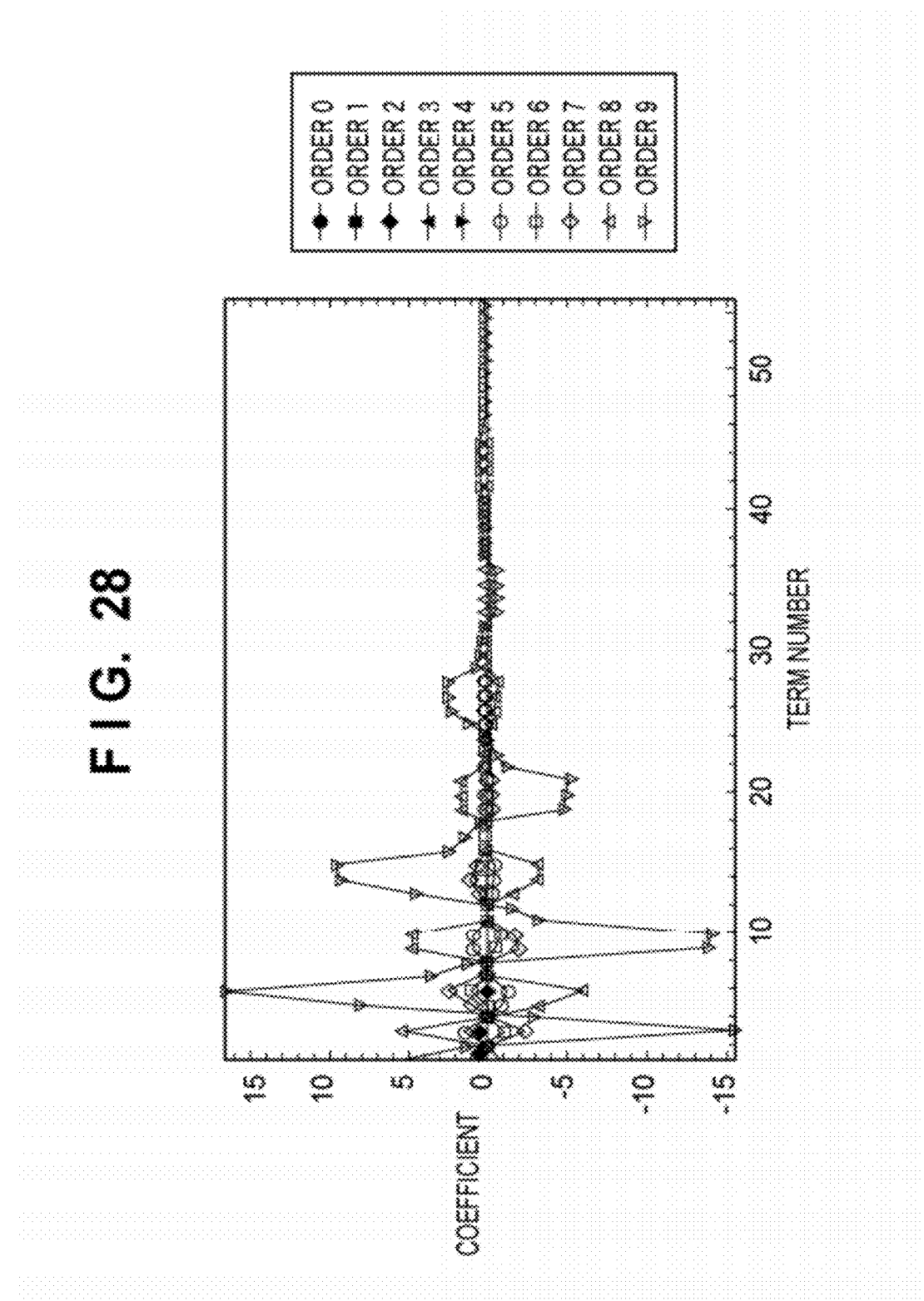

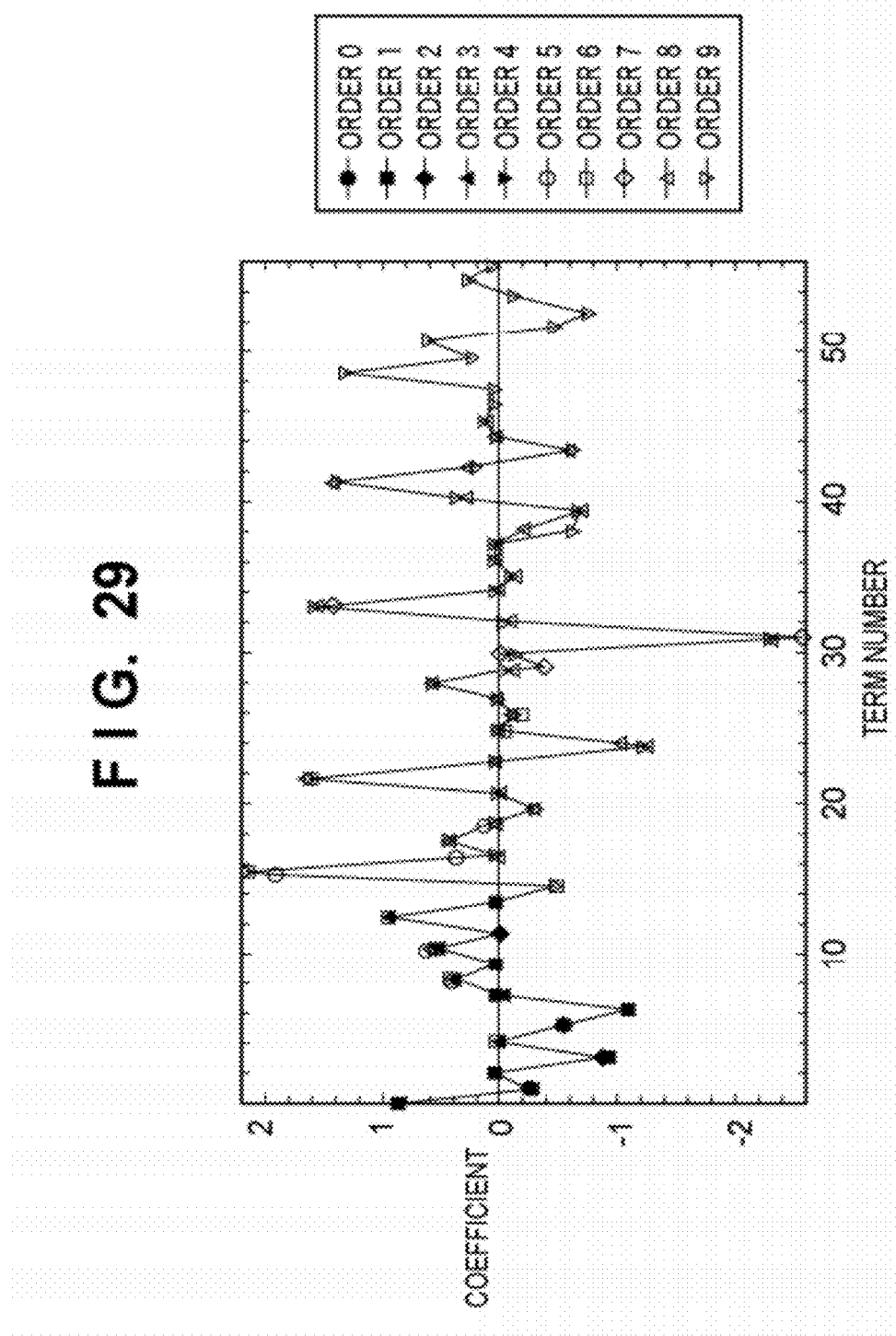

US 9,127,939 B2

SHAPE MEASUREMENT METHOD FOR COMBINING PARTIAL MEASUREMENTS

BACKGROUND OF THE INVENTION

1. Field of the Invention

The present invention relates to a measurement (stitch) for making a plurality of partial measurements, and obtaining an overall shape by combining partial measurement results.

2. Description of the Related Art

A stitch technique was born to avoid cost required to manufacture a large reference optical element used to test an astronomical mirror. For a while since its birth, partial measurement regions did not have any overlapping region, and polynomial fitting was executed with reference to "global smoothness". For this reason, high-resolution information of partial measurement data was lost. In recent years, partial measurement regions have an overlapping region, and combination is executed with reference to "self-consistency". As a result, high-resolution information of partial measurement data can be held.

Respective partial measurements include individual set errors (position/orientation errors). The respective partial measurements include system errors (errors unique to a measurement apparatus) equivalent to all the partial measurements. The stitch technique is also required to correct these set errors and system errors. U.S. Pat. No. 6,956,657 discloses a method for simultaneously calculating the set errors and system errors.

Conventionally, since each partial measurement region in an interference measurement has a circular shape, the Zernike polynomials as a sequence of functions which are orthogonal on a circle were used to define the system errors. In this case, since system error correction on circular partial measurement regions was executed using data of non-circular data existence regions although there was no data outside the overall measurement region on lattices (locations of the partial measurement regions), the precision drops. For the same reason as above, coefficients of bases were different depending on bases of the Zernike polynomials used in system error definition.

SUMMARY OF THE INVENTION

The present invention provides a novel technique which allows to precisely measure a shape of a surface to be detected.

According to one aspect of the present invention, there is provided a stitch measurement method for making a plurality of partial measurements, and obtaining an overall shape by combining partial measurement results, including a lattice formulation step of locating a plurality of partial measurement regions on an overall measurement region, a step of dividing, on lattices, each peripheral partial measurement region including an external portion of the overall measurement region into a first region inside the overall measurement region and a second region outside the overall measurement region, and dividing each central partial measurement region which does not include any external portion of the overall measurement region into a first region and a second region according to division patterns of the peripheral partial measurement region, a step of formulating first orthogonal function sequences on the first regions, a step of defining linear combinations of respective functions of the first orthogonal function sequences on the first regions as first system errors for the respective partial measurement regions on the overall measurement region, a step of formulating a consistency function including coefficients in the linear combinations as variables, and a step of calculating system errors from variables decided by optimizing the consistency function.

Further aspects of the present invention will become apparent from the following description of exemplary embodiments with reference to the attached drawings.

BRIEF DESCRIPTION OF THE DRAWINGS

FIG. 9 shows semicircle polynomials.

FIG. 28 shows Zernike polynomial fitting coefficients.

FIG. 29 shows semicircle polynomial fitting coefficients.

DESCRIPTION OF THE EMBODIMENTS

Figure 1:
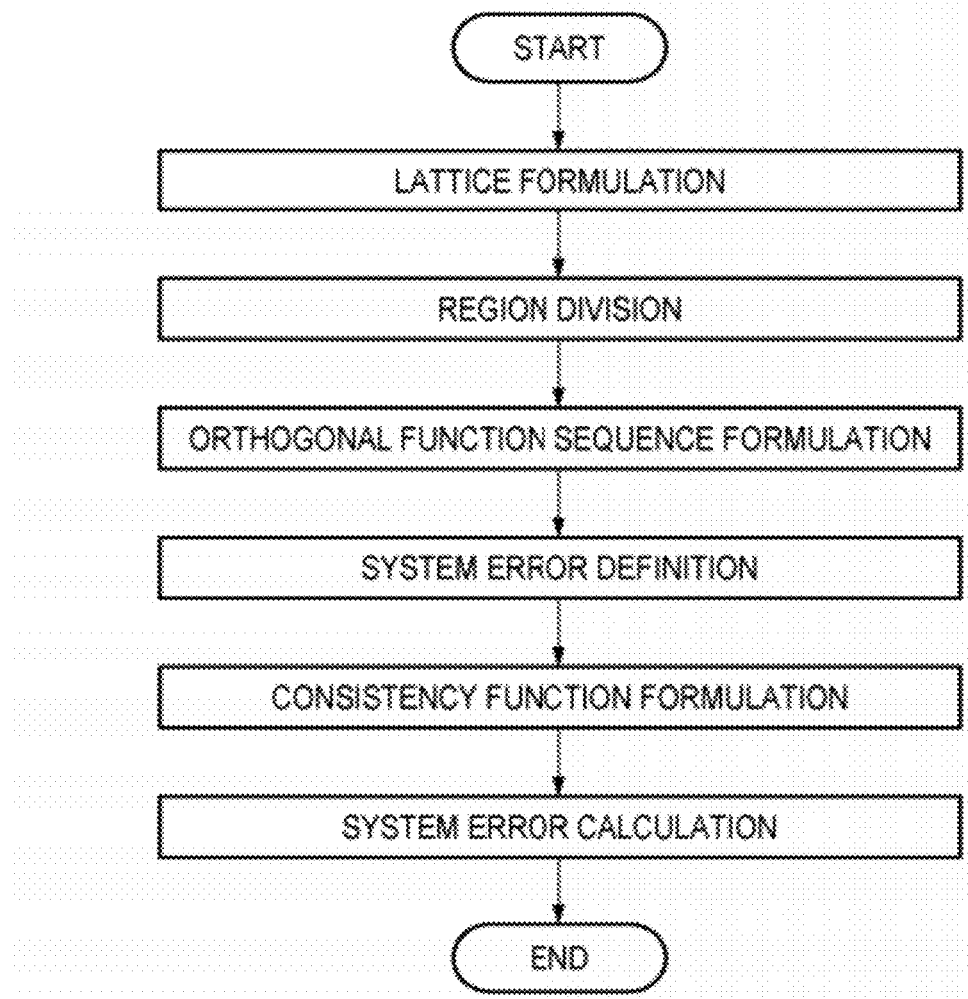
FIG. 1 is a flowchart for explaining a measurement method according to one aspect of the present invention.

The present invention relates to a stitch measurement method which performs a plurality of partial measurements, and obtains an overall shape by combining these measurement results. FIG. 1 shows the flowchart of the present invention. <Lattice formulation>, <region division>, <orthogonal function sequence formulation>, <system error definition>, <consistency function formulation>, and <system error calculation> will be described in turn as steps of this flowchart.

<Lattice Formulation>

Figure 2:
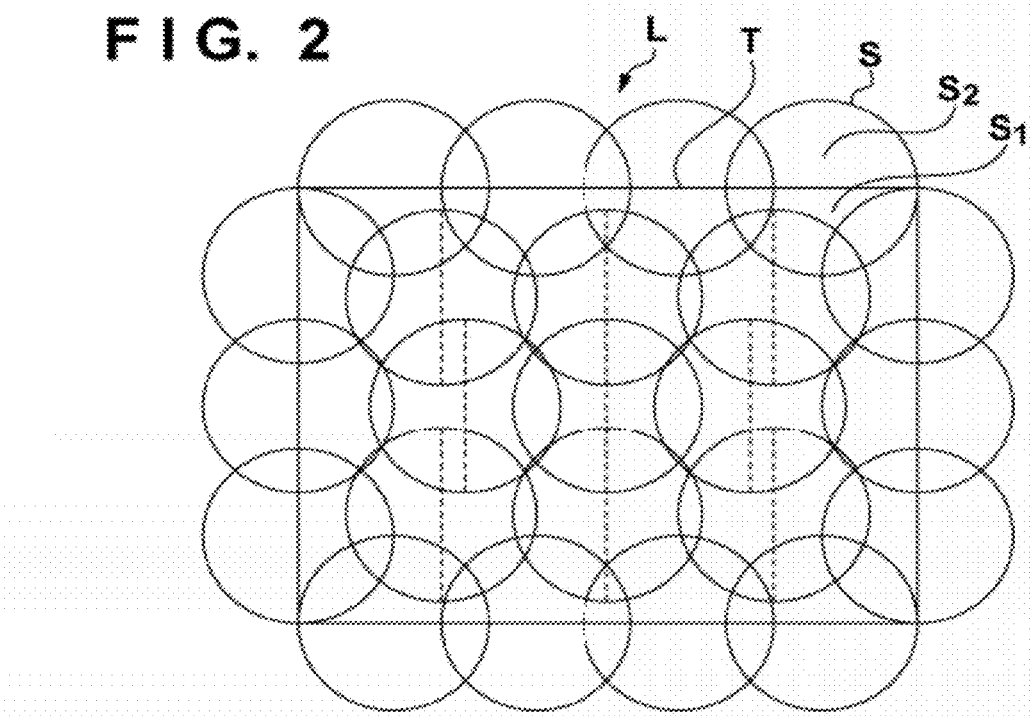
FIG. 2 shows lattices when an overall measurement region: a rectangle, a partial measurement region: a circle, a first region: a semicircle, and a second region: a semicircle.
Figure 3:
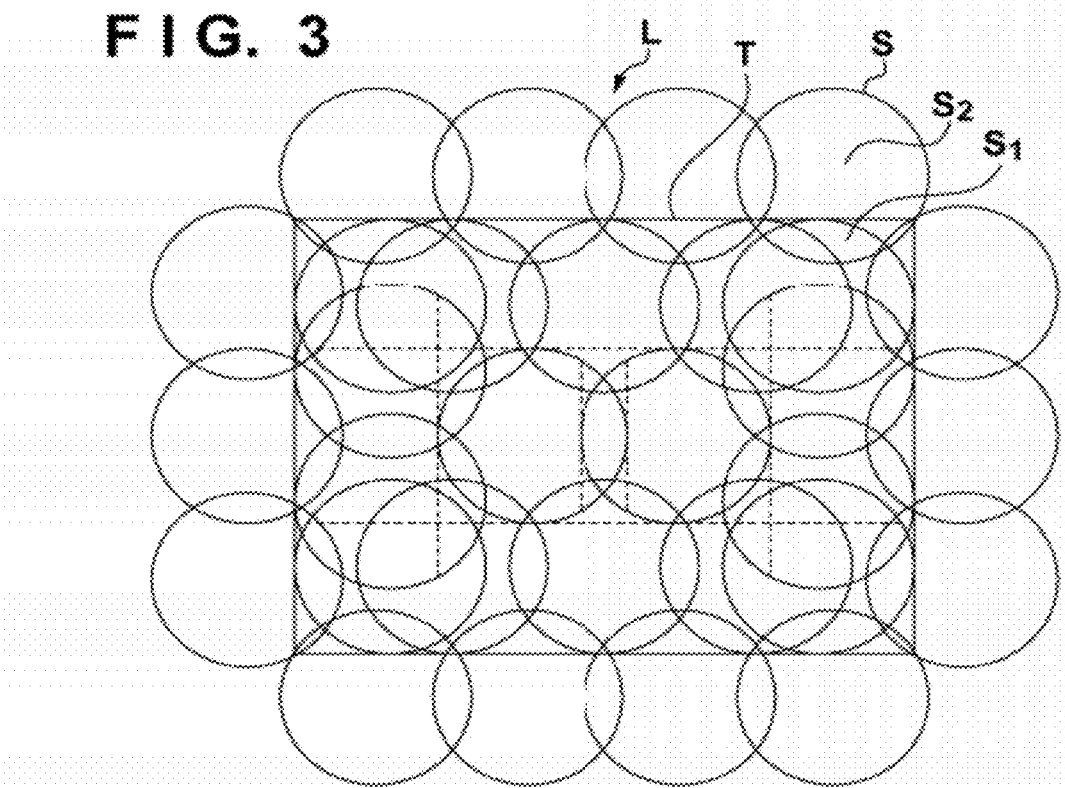
FIG. 3 shows lattices when an overall measurement region: a rectangle, a partial measurement region: a circle, a first region: a reduced semicircle, and a second region: an enlarged semicircle.
Figure 4:
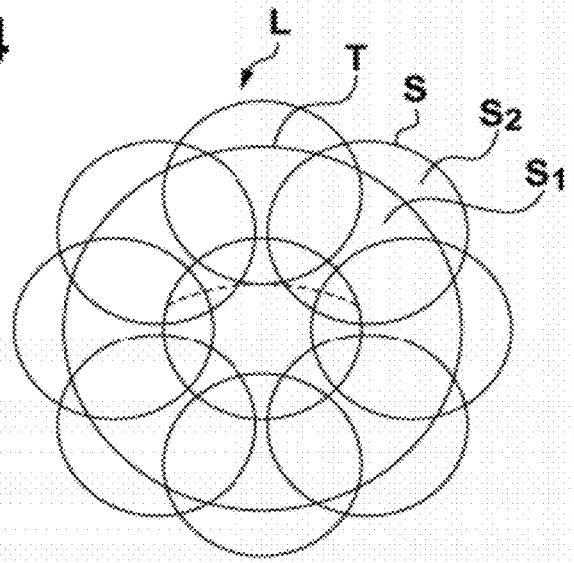
FIG. 4 shows lattices when an overall measurement region: a circle, a partial measurement region: a circle, a first region: a gibbous shape, a second region: a crescent, and a y-coordinate of an intersection between small and large circles: positive.
Figure 5:
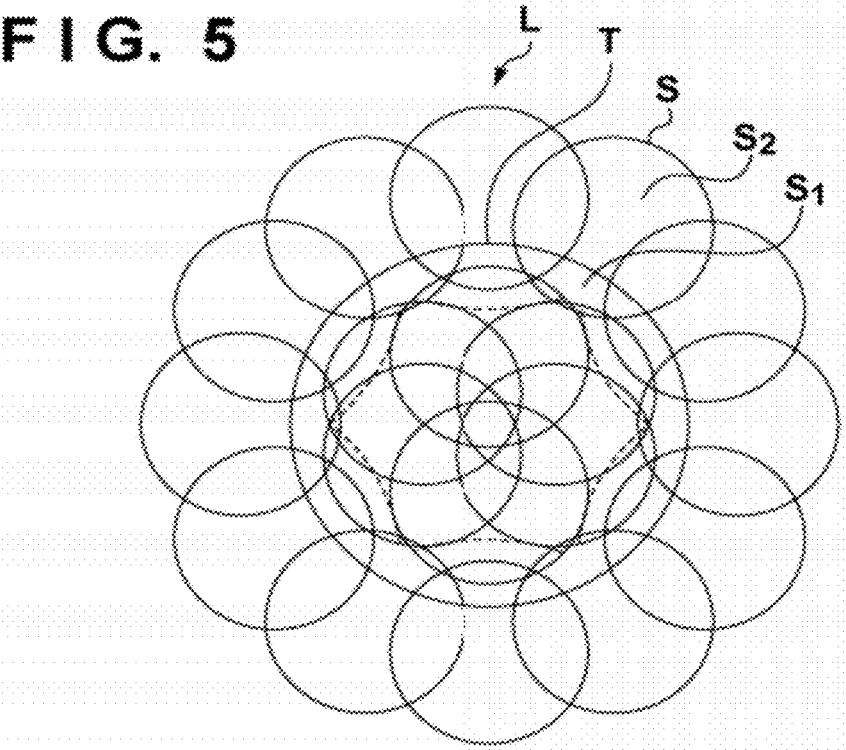
FIG. 5 shows lattices when an overall measurement region: a circle, a partial measurement region: a circle, a first region: a gibbous shape, a second region: a crescent, and a y-coordinate of an intersection between small and large circles: negative.
Figure 6:
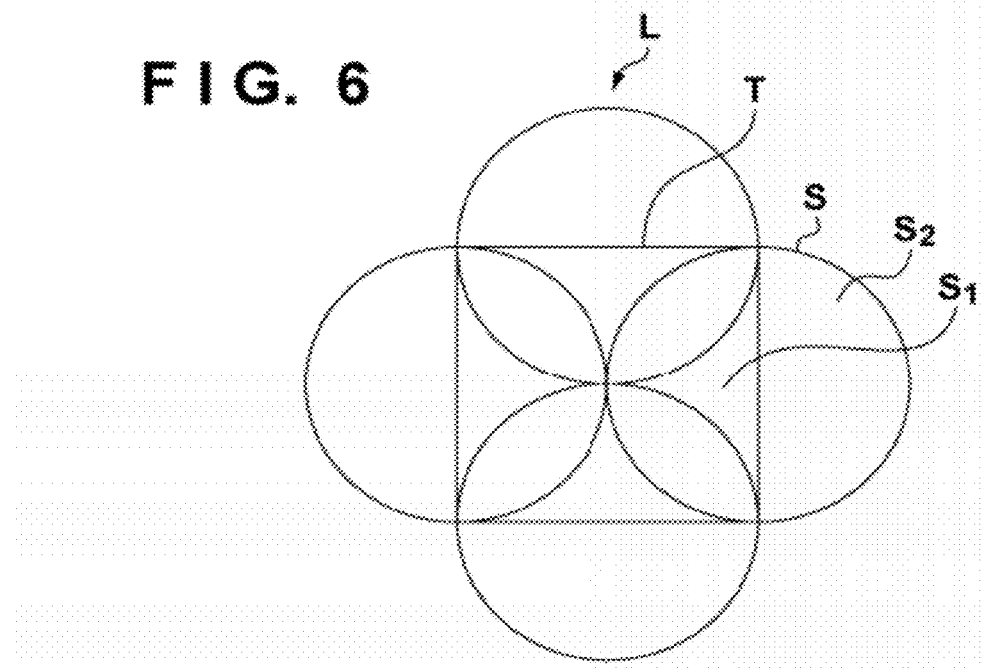
FIG. 6 shows lattices when a second system error need not be defined.
Figure 7:
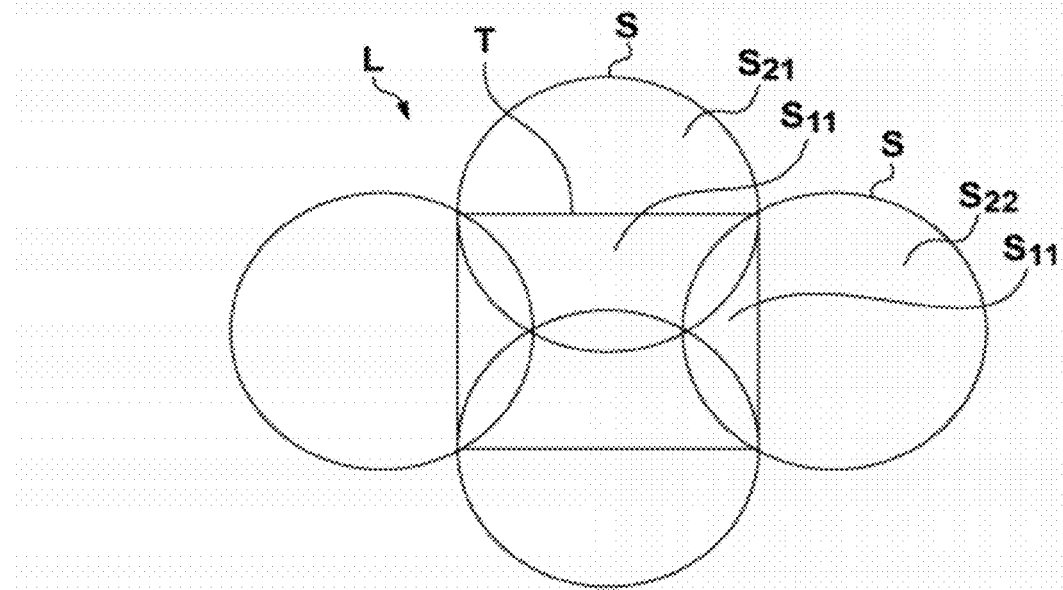
FIG. 7 shows lattices when first regions are not congruent.
Figure 8:
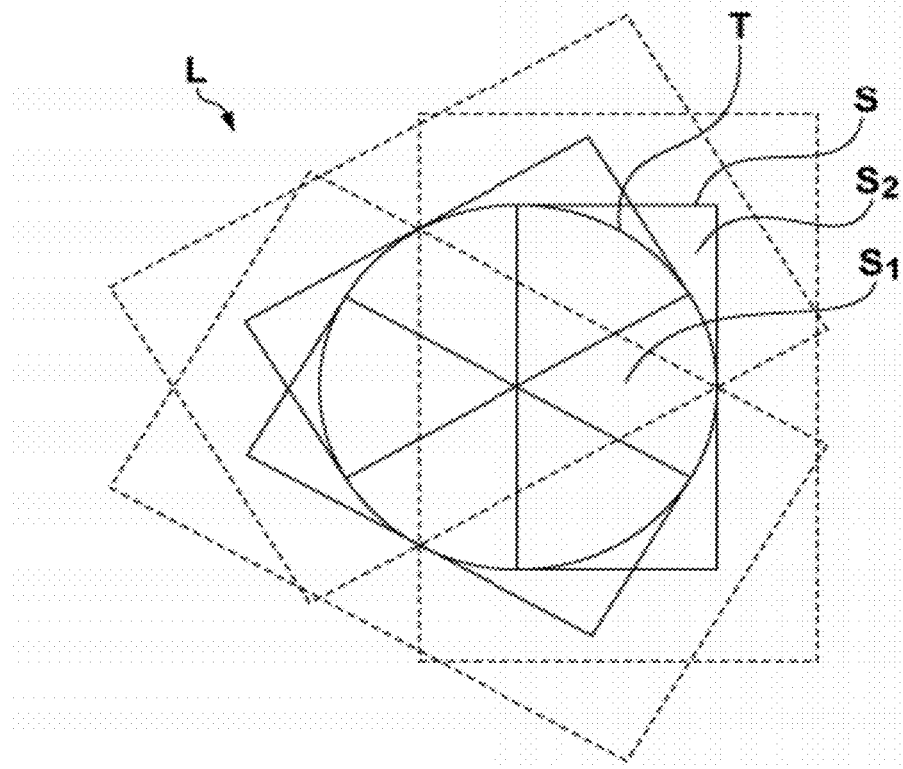
FIG. 8 shows lattices when specific regions are extracted from partial measurement regions in advance.

Initially, lattice formulation for locating a plurality of partial measurement regions (measurement ranges) on an overall measurement region (surface to be detected) is executed. Note that the plurality of measurement ranges are respectively set so that one measurement range forms an overlapping region with another measurement range. FIGS. 2 and 3 show examples when the overall measurement region is a rectangle and the partial measurement regions are circles. FIGS. 4 and 5 show examples when the overall measurement region is a circle and the partial measurement regions are also circles. When respective partial measurements have different orientations, three-dimensional lattices have to be formulated, but two-dimensional lattices are formulated for the sake of simplicity. In these examples, second system errors (to be described later) have to be defined. FIG. 6 shows an example when the second system errors need not be defined. Furthermore, in these examples, first regions (to be described later) are congruent (second regions are also congruent). FIG. 7 shows an example when the first regions are not congruent. In addition, in these examples, no specific regions are extracted from the partial measurement regions in advance. FIG. 8 shows an example when specific regions are extracted from the partial measurement regions in advance.

<Region Division>

On lattices, each peripheral partial measurement region including an external portion of the overall measurement region is divided into a first region inside the overall measurement region, and a second region outside the overall measurement region. Each central partial measurement region which does not include any external portion of the overall measurement region is divided into first and second regions according to division patterns of the peripheral partial measurement region. In FIG. 2, the first region is a semicircle, and the second region is also a semicircle. In FIG. 3, the first region is a reduced semicircle, and the second region is an enlarged semicircle. In FIGS. 4 and 5, the first region is a gibbous shape, and the second region is a crescent. In FIG. 7, a first type of the first region is a semicircle, a second type of the first region is a reduced semicircle, a first type of the second region is a semicircle, and a second type of the second region is an enlarged semicircle.

<Orthogonal Function Sequence Formulation>

Next, a first orthogonal function sequence is formulated on each first region. When the first regions are congruent, one type of the first orthogonal function sequence is formulated; when they are not congruent, first orthogonal function sequences as many as the number of types of the first regions are formulated. On lattices, when only the first regions do not cover the overall measurement region, a second orthogonal function sequence is formulated on each second region. When the second regions are congruent, one type of the second orthogonal function sequence is formulated; when they are not congruent, second orthogonal function sequences as many as the number of types of the second regions are formulated. As a formulation method of a sequence of functions which are orthogonal on a specific region, the Gram-Schmidt orthogonalization is available. This defines that $w=\{w_i\}$ is an orthogonal basis sequence with respect to a basis sequence $v=\{v_i\}$. $w=\{w_i\}$ is specified by:

$$w_0 = v_0 \qquad (1)$$

$$w_n = v_n - \sum_{i=0}^{n-1} \frac{(v_n, w_i)}{\|w_i\|^2} w_i$$

Also, a normalized orthogonal basis sequence $u=\{u_i\}$ can also be obtained by normalizing $w=\{w_i\}$ by:

$$u_i = \frac{w_i}{\|w_i\|} \qquad (2)$$

<System Error Definition>

Next, linear combinations of respective functions of the first orthogonal function sequences are defined as first system errors on the first regions for the respective partial measurement regions on the overall measurement region. A case will be examined below wherein the first regions are congruent. However, when the first regions are not congruent, the same processing can be similarly repeated as many as the number of types of the first and second orthogonal function sequences. Letting $w=\{w_i\}$ be the first orthogonal function sequence, and $a=\{a_i\}$ be coefficients (first system error correction variables) in the linear combination, first system errors e are given by:

$$e(x, y) = \sum_{i=0}^{n} a_i w_i(x, y) \qquad (3)$$

By coordinate-transforming those values, the first system errors are defined on the respective partial measurement regions. On the lattices, when only the first regions do not cover the overall measurement region, linear combinations of respective functions of the second orthogonal function sequences are defined as second system errors on the second regions. Letting $w'=\{w'_i\}$ be the second orthogonal function sequence, and $a'=\{a'_i\}$ be coefficients (second system error correction variables) in the linear combination, second system errors e' are given by:

$$e'(x, y) = \sum_{i=0}^{n'} a'_i w'_i(x, y) \qquad (4)$$

By coordinate-transforming those values, the second system errors are defined on the respective partial measurement regions.

<Consistency Function Formulation>

Next, a consistency function including the coefficients (system error correction variables) in the linear combination as variables is formulated. The consistency function is a function of correction variables used as an index of the self-consistency, and the correction variables are decided by optimizing (maximizing or minimizing) this function. The correction variables may include set error correction variables and the like in addition to the system error correction variables. A case will be examined below wherein the first regions are congruent. However, when the first regions are not congruent, the same processing can be similarly repeated as many as the number of types of the first and second system error correction variables. When the system error correction variables include only the first system error correction variables, a consistency function c is given by:

$$c = c(a, \ldots) \quad (5)$$

When the system error correction variables include the second system error correction variables, a consistency function c' is given by:

$$c' = c'(a, a', \ldots) \quad (6)$$

For example, U.S. Pat. No. 6,956,657 uses the following consistency function. A weighted average of corrected measurement values (obtained by correcting measurement values using the correction variables) of respective partial measurements at one point on a measurement region is calculated. Then, weighted variances of the corrected measurement values are calculated using this weighted average. Finally, weighted averages are calculated at all data points of those weighted variances, and are used as a consistency function.

<System Error Calculation>

Finally, system errors are calculated from the variables determined by optimizing the consistency function. A case will be examined below wherein the first regions are congruent. However, when the first regions are not congruent, the same processing can be similarly repeated as many as the number of types of the first and second system error correction variables. When the system error correction variables include only the first system error correction variables, letting $a^o = \{a^o_i\}$ be the decided first system error correction variables, the system error correction variables when the maximization and minimization are used as the optimization are respectively given by:

$$(a^o, \ldots) = \mathrm{argmax}\, c(a, \ldots)$$

$$(a^o, \ldots) = \mathrm{argmin}\, c(a, \ldots) \quad (7)$$

When the system error correction variables include the second system error correction variables, letting $a'^o = \{a'^o_i\}$ be the decided second system error correction variables, the system error correction variables when the maximization and minimization are used as the optimization are respectively given by:

$$(a^o, a'^o, \ldots) = \mathrm{argmax}\, c'(a, a', \ldots)$$

$$(a^o, a'^o, \ldots) = \mathrm{argmin}\, c'(a, a', \ldots) \quad (8)$$

Using the decided system error correction variables, system errors are respectively calculated by:

$$e(x, y) = \sum_{i=0}^{n} a_i^o w_i(x, y) \quad (9)$$

$$e'(x, y) = \sum_{i=0}^{n'} a_i'^o w_i'(x, y)$$

The optimization method is selected based on the consistency function as an objective function. For example, in U.S. Pat. No. 6,956,657, since the corrected measurement values are obtained by adding the linear combinations of the correction variables to the measurement values, the above consistency function is a quadratic function of the correction variables. Also, a restriction that the correction variables exist inside a hyper-ellipsoid on a dimensional space of the correction variables is added. This quadratic restriction quadratic function optimization can be easily solved by the Lagrange undetermined multiplier or penalty function method.

First Embodiment

An embodiment when the overall measurement region is a rectangle and each partial measurement region is a circle will be explained below (see FIG. 2). Note that since the <consistency function formulation> and <system error calculation> steps do not depend on this embodiment, a description thereof will not be given.

<Lattice Formulation>

Lattices shown in FIG. 2 are formulated.

<Region Division>

The first region is a semicircle, and the second region is also a semicircle.

<Orthogonal Function Sequence Formulation>

Semicircle polynomials as a sequence of polynomials which are orthogonal on a semicircle are formulated. A function sequence v is given by:

$$v = \{v_i^j\} = \{v_0^0, v_1^0, v_1^1, v_2^0, v_2^1, v_2^2, v_3^0, v_3^1, v_3^2, v_3^3, \ldots\}$$
$$= \{1, x, y, x^2, xy, y^2, x^3, x^2y, xy^2, y^3, \ldots\} \quad (10)$$

where $v_i^j$ is given by:

$$v_i^j = x^{i-j} y^j \quad (11)$$

Figure 10:
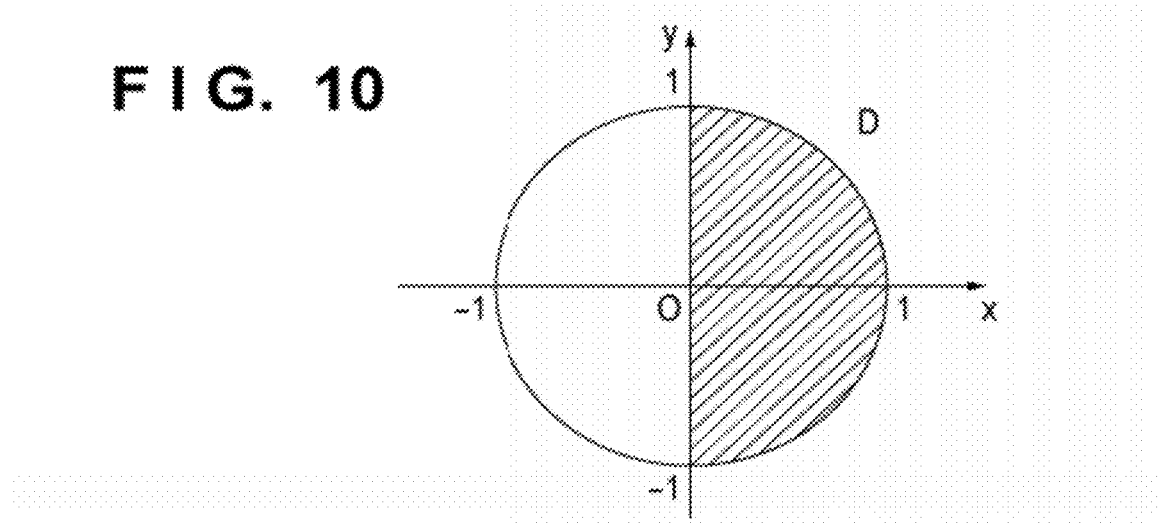
FIG. 10 shows a domain (semicircle) of the semicircle polynomials.

A domain D is given by (see FIG. 10):

$$D = \{(x, y) | x^2 + y^2 < 1, x > 0\} \quad (12)$$

An inner product is given by:

$$(p_1, p_2) = \int\int_D p_1(x, y) p_2(x, y) dx dy \quad (13)$$
$$= \int_0^1 \int_{-\sqrt{1-x^2}}^{\sqrt{1-x^2}} p_1(x, y) p_2(x, y) dy dx$$

Note that arguments of the inner product are polynomials. Since polynomials×polynomials are polynomials, integrands of multiple integrals are polynomials. Hence, computing of termwise integrals can be reduced to an integral (inner product reduction function), which is given by:

$$f(m, n) = \int\int_D x^m y^n dx dy = \int_0^1 x^m \int_{-\sqrt{1-x^2}}^{\sqrt{1-x^2}} y^n dy dx \quad (14)$$

When this function is calculated, we have:

$$f(m, n) = \begin{cases} 0 & (n:\text{odd}) \\ \dfrac{B\left(\dfrac{m+1}{2}, \dfrac{n+3}{2}\right)}{n+1} & (n:\text{even}) \end{cases} \quad (15)$$

where B is a beta function, which is given by:

$$B(a,b) = \int_0^1 t^{a-1}(1-t)^{b-1} dt \quad (16)$$

Then, a function sequence $w = \{w_i^j\}$ which is orthogonal on D can be calculated by:

$$w_0^0 = v_0^0 = 1 \quad (17)$$

$$w_n^k = v_n^k - \sum_{i=0}^{n_{-1}(n,k)} \sum_{j=0}^{k_{-1}(n,k,i)} \frac{(v_n^k, w_i^j)}{\|w_i^j\|^2} w_i^j$$

where $n_{-1}$ and $k_{-1}$ are respectively given by:

$$n_{-1}(n, k) = \begin{cases} n-1 & (k = 0) \\ n & (k \neq 0) \end{cases} \quad (18)$$

$$k_{-1}(n, k, i) = \begin{cases} k-1 & (i = n) \\ i & (i \neq n) \end{cases}$$

Note that the inner product (including a square of a norm) can be calculated using the inner product reduction function by:

$$\begin{aligned}(p_1, p_2) &= \iint_D p_1(x, y) p_2(x, y) dx dy \\ &= \iint_D \sum_i \sum_j a_{ij} x^i y^j dx dy \\ &= \sum_i \sum_j a_{ij} \iint_D x^i y^j dx dy \\ &= \sum_i \sum_j a_{ij} f(i, j)\end{aligned} \quad (19)$$

The aforementioned computations can be manually made, but it is convenient for such computations to use a Computer Algebra System. When the Computer Algebra System is used, the computations can be made more efficiently using Memorization.

Figure 17:
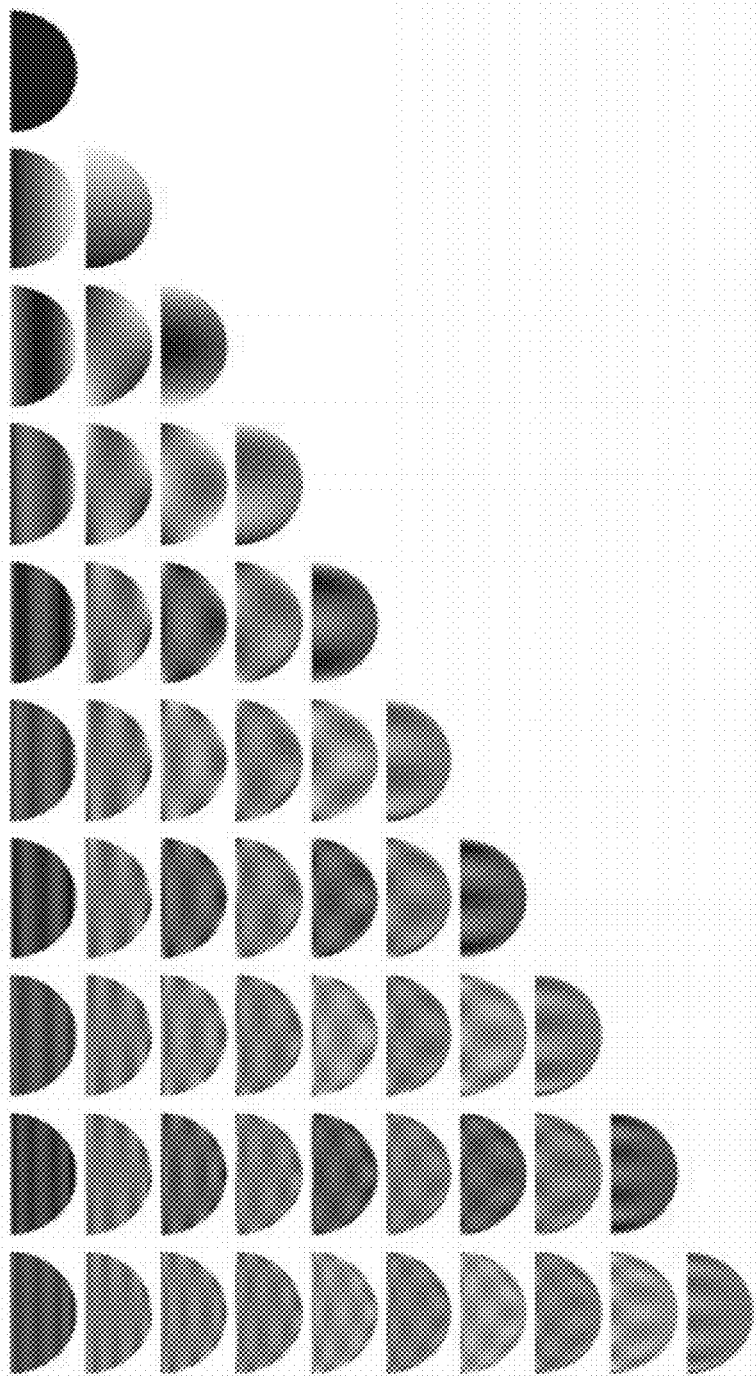
FIG. 17 shows a basis graph table of semicircle polynomials.

FIG. 9 shows the semicircle polynomials obtained by executing the aforementioned computations. FIG. 17 shows a table of basis graphs on a domain. In FIG. 17, an order (n) increases like order 0, order 1, ..., order 9 in turn from top down, and an order term number (k) increases like order n term 0, order n term 1, ..., order n term n in turn from left to right.

<System Error Definition>

The semicircle polynomials undergo coordinate transformation according to the respective partial measurement regions, and linear combinations of bases are defined as the first and second system errors. Four types of the first and second system errors are to be defined when a measurement apparatus or measurement target is moved by only translation (a set of first system errors is equal to that of second system errors), and one type is to be defined when it is also moved by rotation.

Second Embodiment

An embodiment when the overall measurement region is a rectangle and each partial measurement region is a circle, which is different from the first embodiment, will be described below (see FIG. 3). Note that since the <consistency function formulation> and <system error calculation> steps do not depend on this embodiment, a description thereof will not be given.

<Lattice Formulation>

Lattices shown in FIG. 3 are formulated.

<Region Division>

The first region is a reduced semicircle, and the second region is an enlarged semicircle.

<Orthogonal Function Sequence Formulation>

Extended semicircle polynomials as a sequence of polynomials, which are orthogonal on an extended semicircle that expresses a reduced semicircle or enlarged semicircle by an extended distance d (d=0: a semicircle, d<0: a reduced semicircle, d>0: an enlarged semicircle), are formulated.

The definition of the function sequence v and the formulation of the orthogonal function sequence w are the same as those in the first embodiment.

A domain is different from that in the first embodiment, and an inner product and inner product reduction function are also different accordingly.

Figure 11:
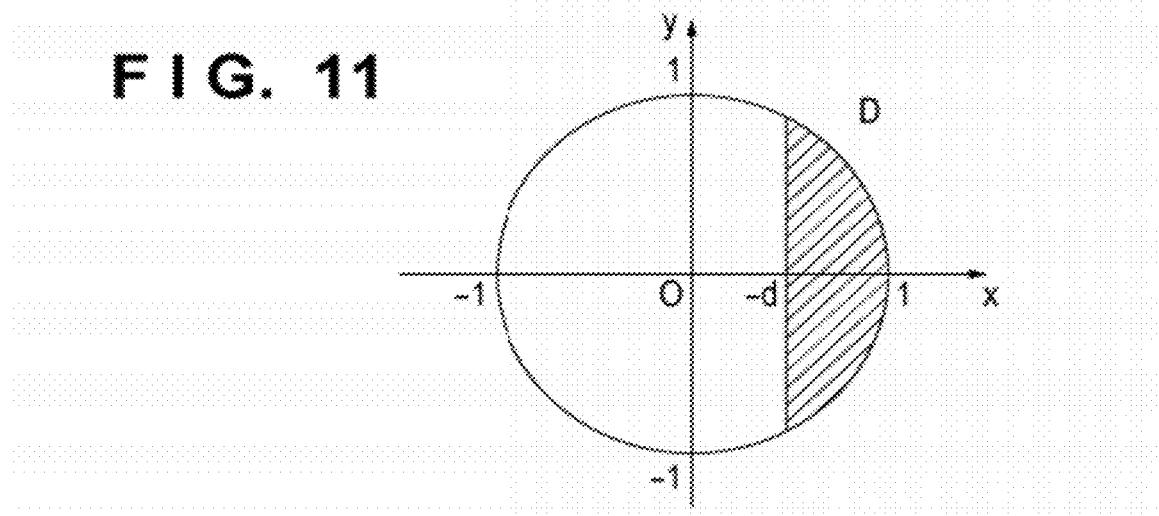
FIG. 11 shows a domain (reduced semicircle) of extended semicircle polynomials.
Figure 12:
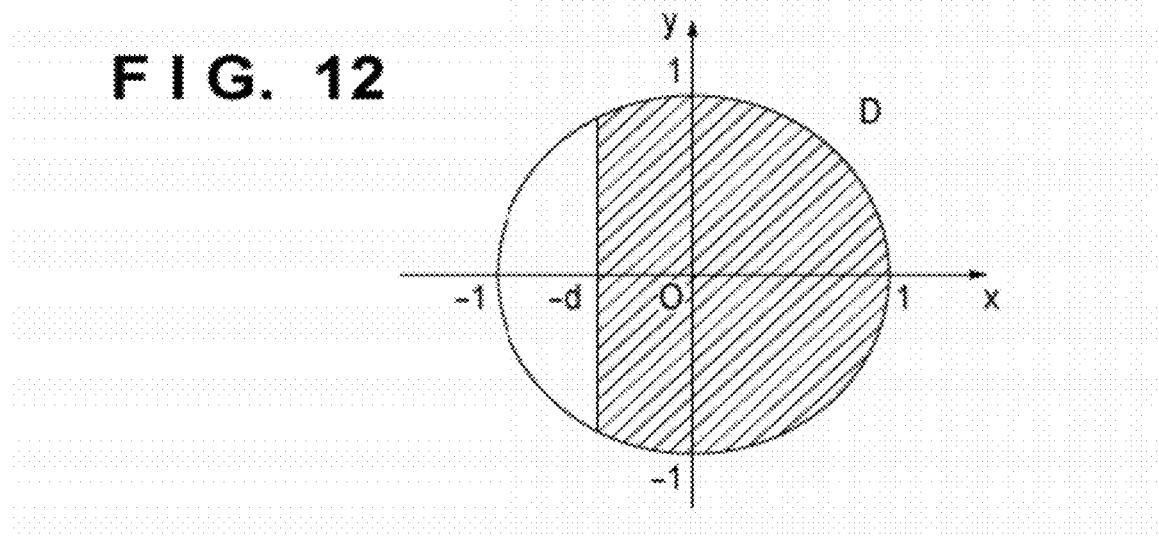
FIG. 12 shows a domain (enlarged semicircle) of extended semicircle polynomials.

A domain D is given by (see FIG. 11 for the reduced semicircle and FIG. 12 for the enlarged semicircle):

$$D = \{(x,y) | x^2 + y^2 < 1, x > -d\} \quad (20)$$

An inner product is given by:

$$\begin{aligned}(p_1, p_2) &= \iint_D p_1(x, y) p_2(x, y) dx dy \\ &= \int_{-d}^{1} \int_{-\sqrt{1-x^2}}^{\sqrt{1-x^2}} p_1(x, y) p_2(x, y) dy dx\end{aligned} \quad (21)$$

An inner product reduction function is given by:

$$f(m, n, d) = \iint_D x^m y^n dx dy \int_{-d}^{1} x^m \int_{-\sqrt{1-x^2}}^{\sqrt{1-x^2}} y^n dy dx \quad (22)$$

When this function is calculated, we have:

$$f(m, n, d) = \quad (23)$$

$$\begin{cases} 0 & (n:\text{odd}) \\ \dfrac{B\left(\dfrac{m+1}{2}, \dfrac{n+3}{2}\right) + s(m, d) B_{d^2}\left(\dfrac{m+1}{2}, \dfrac{n+3}{2}\right)}{n+1} & (n:\text{even}) \end{cases}$$

where s is given by:

$$s(m,d) = \begin{cases} -1 & (d<0) \\ (-1)^m & (d>0) \end{cases} \quad (24)$$

Also, $B_z$ is an incomplete beta function, which is given by:

$$B_z(a,b) = \int_o^z t^{a-1}(1-t)^{b-1} dt \quad (25)$$

Figure 18:
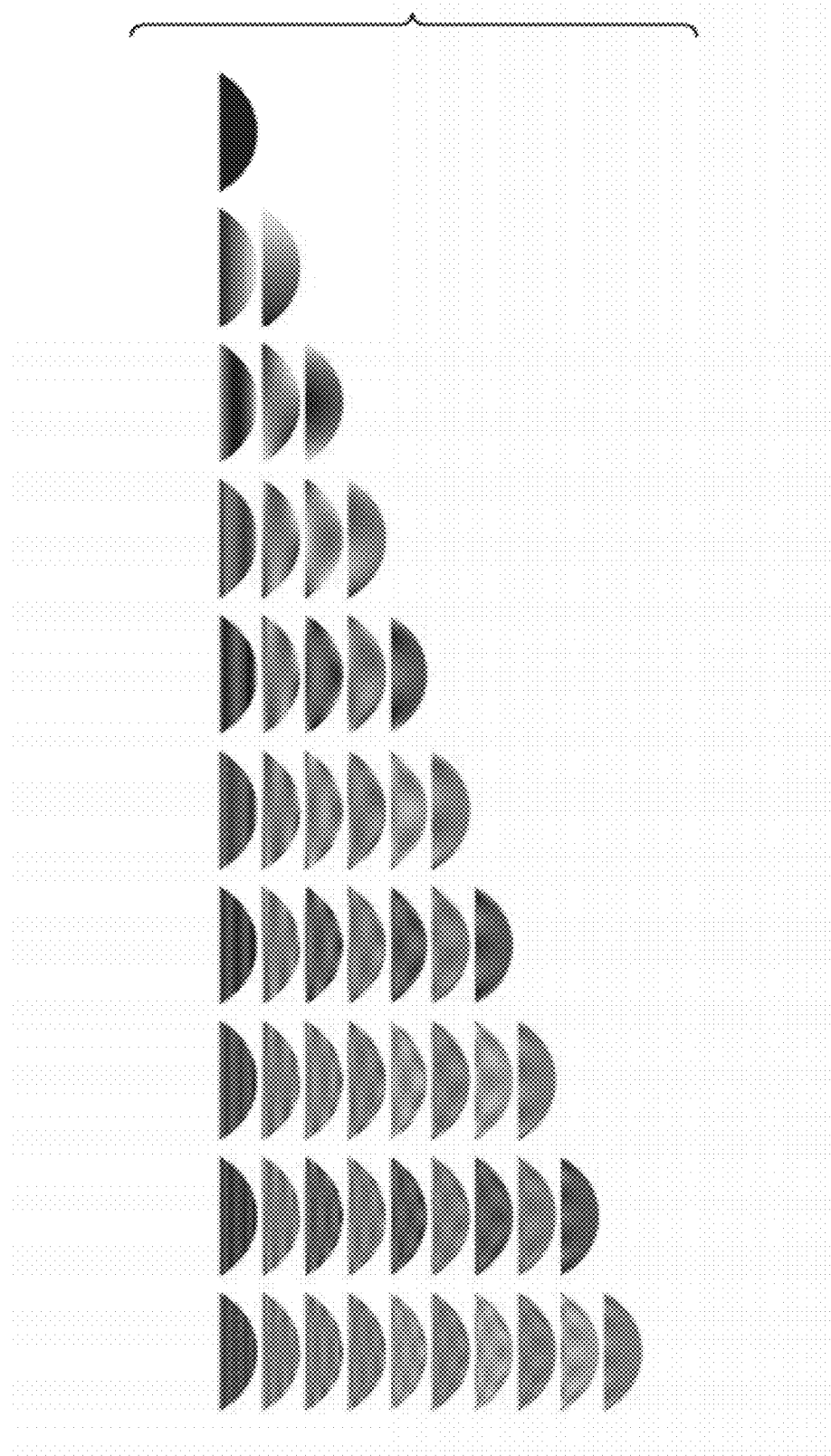
FIG. 18 shows a basis graph table (domain: a reduced semicircle) of extended semicircle polynomials.
Figure 19:
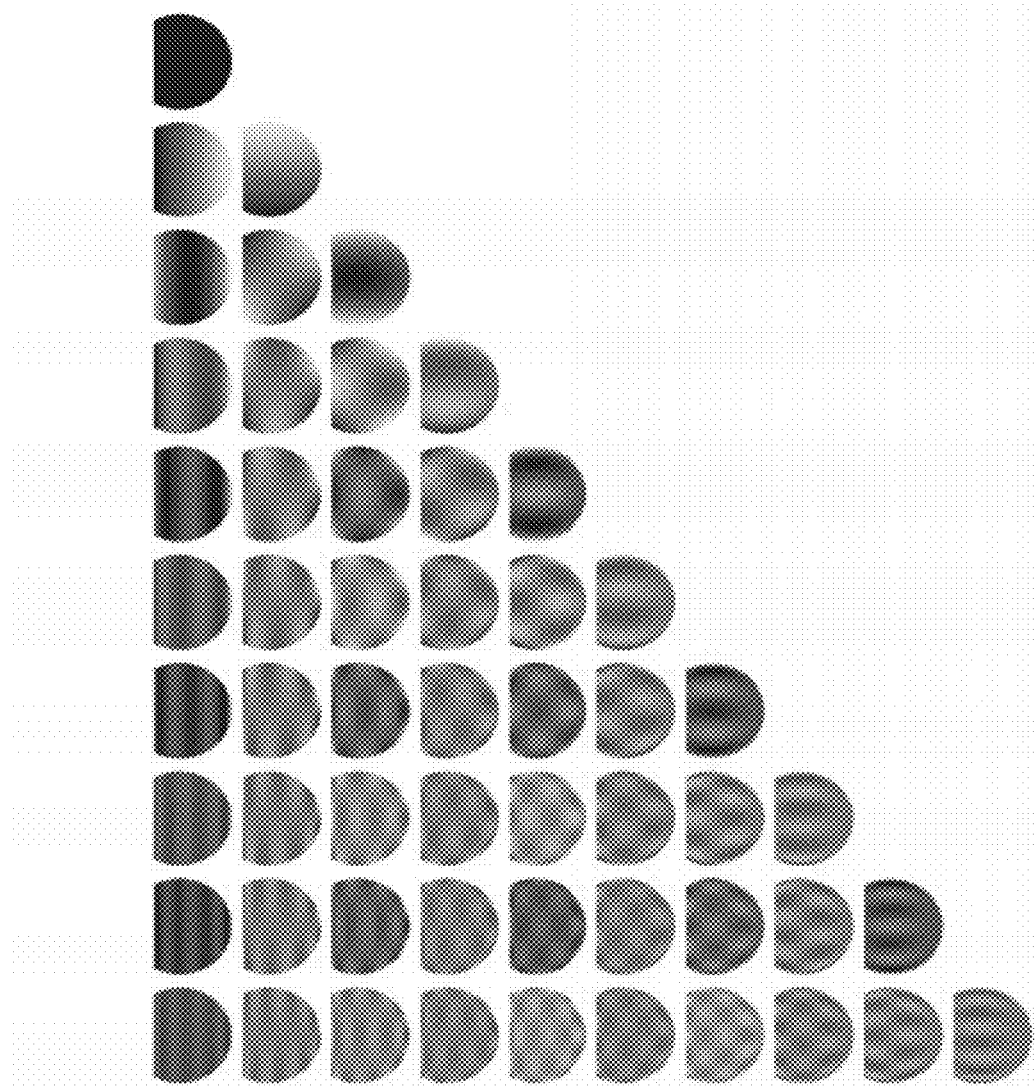
FIG. 19 shows a basis graph table (domain: an enlarged semicircle) of extended semicircle polynomials.
Figure 20:
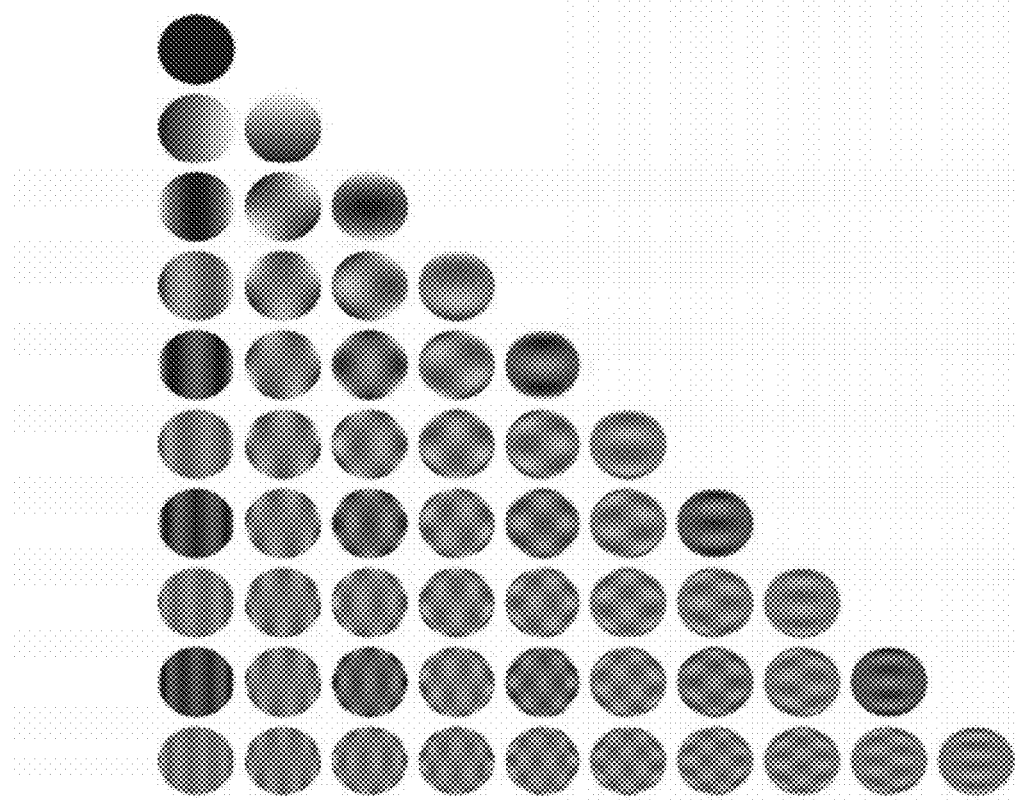
FIG. 20 shows a basis graph table (domain: a full circle) of extended semicircle polynomials/gibbous polynomials/crescent polynomials.

FIG. 18 (reduced semicircle: $d=-\frac{1}{2}$) and 19 (enlarged semicircle: $d=\frac{1}{2}$) show basis graph tables of the extended semicircle polynomials formulated using this inner product reduction function. When $d=0$, the extended semicircle polynomials become the semicircle polynomials described in the first embodiment, and when $d=1$, they become an orthogonal polynomial sequence on a whole circle (see FIG. 20 for a basis graph table), which is different from the Zernike polynomials.

<System Error Definition>

The extended semicircle polynomials are formulated respectively using the extended distance d corresponding to the reduced semicircle and the extended distance d corresponding to the enlarged semicircle and undergo coordinate transformation according to the respective partial measurement regions, and linear combinations of bases are defined as first and second system errors. Four types of the first and second system errors are to be defined when a measurement apparatus or measurement target is moved by only translation, and one type is to be defined when it is also moved by rotation.

Third Embodiment

An embodiment when the overall measurement region is a circle, and each partial measurement region is also a circle will be described below (see FIG. 4). Note that since the <consistency function formulation> and <system error calculation> steps do not depend on this embodiment, a description thereof will not be given.

<Lattice Formulation>

Lattices shown in FIG. 4 are formulated.

<Region Division>

The first region is a gibbous shape, and the second region is a crescent.

<Orthogonal Function Sequence Formulation>

Crescent polynomials as a sequence of polynomials which are orthogonal on a crescent and gibbous polynomials which are orthogonal on a gibbous shape when a y-coordinate ($y_0$) of an intersection between small and large circles is positive ($y_0>0$) are formulated.

The definition of the function sequence v and the formulation of the orthogonal function sequence w are the same as those in the first embodiment.

A domain is different from that in the first embodiment, and an inner product and inner product reduction function are also different accordingly.

[Crescent Polynomials]

Figure 13:
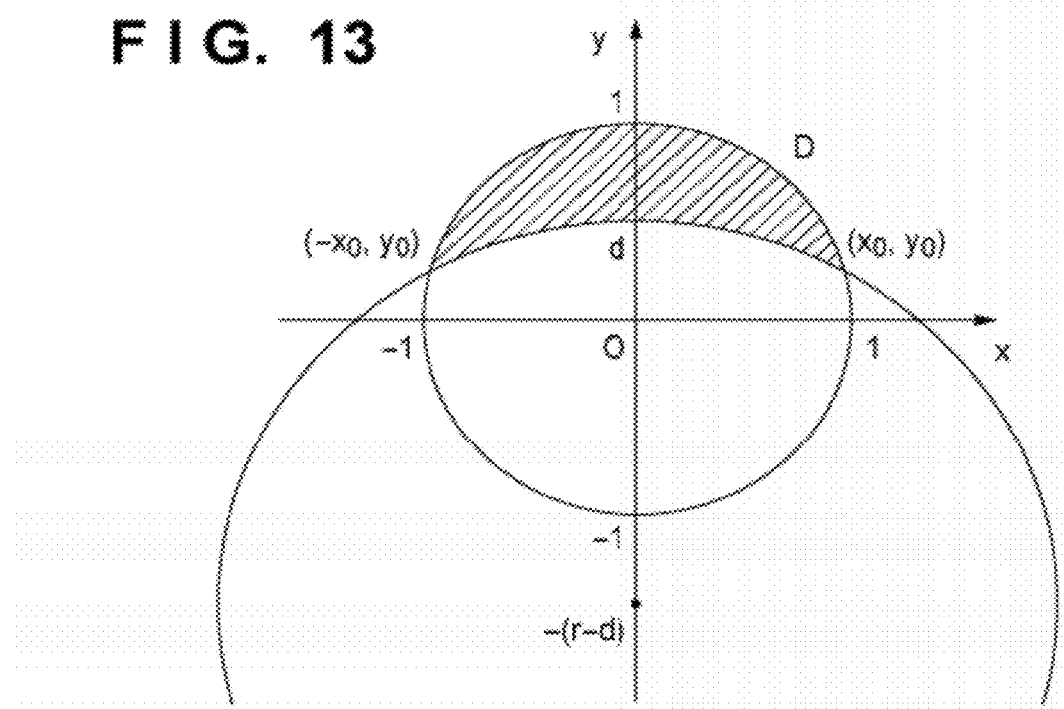
FIG. 13 shows a domain (a crescent having a positive y-coordinate of an intersection between small and large circles) of crescent polynomials.

A domain D is given by (see FIG. 13):

$$D=\{(x,y)|x^2+y^2<1, y>-(r-d)+\sqrt{r^2-x^2}\} \quad (26)$$

where d is a larger one of y-intercepts of the large circle, and r is the radius of the large circle.

When the coordinates of the intersection between the small and large circles are expressed by ($\pm x_0$, $y_0$) ($x_0>0$), we have:

$$x_0 = \frac{\sqrt{(1+d)(1-d)(2r-(1+d))(2r+(1-d))}}{2(r-d)} \quad (27)$$

$$y_0 = \frac{2rd-(1+d^2)}{2(r-d)}$$

An inner product is given by:

$$(p_1, p_2) = \int\int_D p_1(x,y)p_2(x,y)dxdy \quad (28)$$

$$= \int_{-x_0}^{x_0} \int_{-(r-d)+\sqrt{r^2-x^2}}^{\sqrt{1-x^2}} p_1(x,y)p_2(x,y)dydx$$

An inner product reduction function is given by:

$$f(m,n,d,r) = \int\int_D x^m y^n dxdy \quad (29)$$

$$= \int_{-x_0}^{x_0} x^m \int_{-(r-d)+\sqrt{r^2-x^2}}^{\sqrt{1-x^2}} y^n dydx$$

When this function is calculated, we have:

$$f(m,n,d,r) = \quad (30)$$

$$\begin{cases} 0 & (m:\text{odd}) \\ \dfrac{B_{x_0^2}\left(\dfrac{m+1}{2},\dfrac{n+3}{2}\right) - r^{m+n+2}\sum_{i=0}^{n+1}\binom{n+1}{i}\left(-\dfrac{r-d}{r}\right)^{n+1-i} B_{(x_0/r)^2}\left(\dfrac{m+1}{2},\dfrac{i+2}{2}\right)}{n+1} & (m:\text{even}) \end{cases}$$

Figure 21:
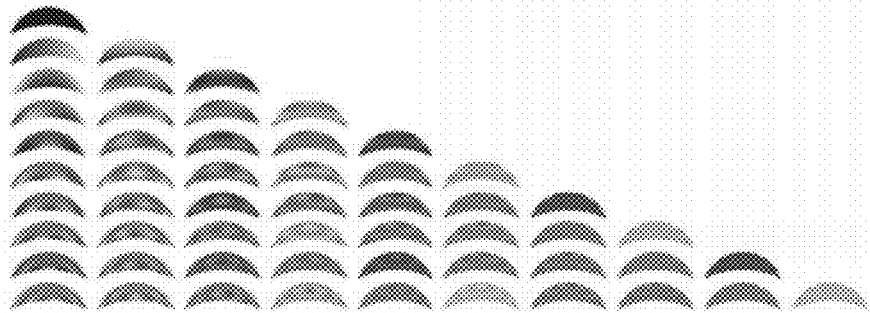
FIG. 21 shows a basis graph table (a y-coordinate of an intersection between small and large circles: positive) of crescent polynomials.

FIG. 21 ($d=\frac{1}{2}$, $r=2$) shows a basis graph table of the crescent polynomials formulated using this inner product reduction function.

[Gibbous Polynomials]

Figure 14:
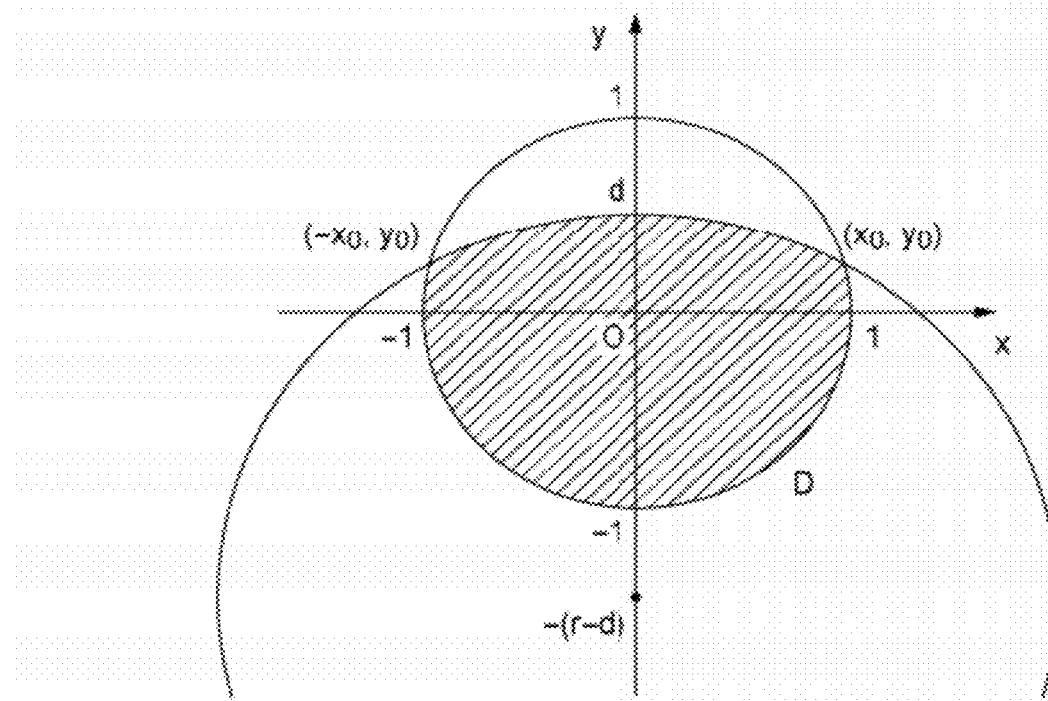
FIG. 14 shows a domain (a gibbous shape having a positive y-coordinate of an intersection between small and large circles) of gibbous polynomials.

A domain D is given by (see FIG. 14):

$$D=\{(x,y)|x^2y^2<1, y<-(r-d)+\sqrt{r^2-x^2}\} \quad (31)$$

This domain is divided into the following three domains $D_1$, $D_2$ and $D_3$:

$$D_1 = \{(x,y) | x^2+y^2<1, x<-x_0\} \quad (32)$$

$$D_2 = \{(x,y) | x^2+y^2<1, -x_0<x<x_0, y<-(r-d)+\sqrt{r^2-x^2}\}$$

$$D_3 = \{(x,y) | x^2+y^2<1, x_0<x\}$$

An inner product is given by:

$$(p_1, p_2) = \int\int_D p_1(x,y)p_2(x,y)dxdy \quad (33)$$

$$= \int\int_{D_1} p_1(x,y)p_2(x,y)dxdy +$$

-continued $$\iint_{D_2} p_1(x, y)p_2(x, y)dxdy +$$

$$\iint_{D_3} p_1(x, y)p_2(x, y)dxdy$$

$$= \int_{-1}^{-x_0} \int_{-\sqrt{1-x^2}}^{\sqrt{1-x^2}} p_1(x, y)p_2(x, y)dydx +$$

$$\int_{-x_0}^{x_0} \int_{-\sqrt{1-x^2}}^{-(r-d)+\sqrt{r^2-x^2}} p_1(x, y)p_2(x, y)dydx +$$

$$\int_{x_0}^{1} \int_{-\sqrt{1-x^2}}^{\sqrt{1-x^2}} p_1(x, y)p_2(x, y)dydx$$

An inner product reduction function is given by:

$$f(m, n, d, r) = \iint_D x^m y^n dxdy \quad (34)$$

$$= \iint_{D_1} x^m y^n dxdy + \iint_{D_2} x^m y^n dxdy +$$

$$\iint_{D_3} x^m y^n dxdy$$

$$= \int_{-1}^{-x_0} x^m \int_{-\sqrt{1-x^2}}^{\sqrt{1-x^2}} y^n dydx +$$

$$\int_{-x_0}^{x_0} x^m \int_{-\sqrt{1-x^2}}^{-(r-d)+\sqrt{r^2-x^2}} y^n dydx +$$

$$\int_{x_0}^{1} x^m \int_{-\sqrt{1-x^2}}^{\sqrt{1-x^2}} y^n dydx$$

When this function is calculated, we have:

$$f(m, n, d, r) = \quad (35)$$

$$\begin{cases} 0 & (m: \text{odd}) \\ \dfrac{(-1)^n B_{x_0^2}\left(\dfrac{m+1}{2}, \dfrac{n+3}{2}\right) + r^{m+n+2}\sum_{i=0}^{n+1}\binom{n+1}{i}\left(-\dfrac{r-d}{r}\right)^{n+1-i} B_{\left(\frac{x_0}{r}\right)^2}\left(\dfrac{m+1}{2}, \dfrac{i+2}{2}\right)}{n+1} & (n: \text{odd}) \\ \dfrac{2B\left(\dfrac{m+1}{2}, \dfrac{n+3}{2}\right) + (-2+(-1)^n)B_{x_0^2}\left(\dfrac{m+1}{2}, \dfrac{n+3}{2}\right) +}{} \\ \dfrac{r^{m+n+2}\sum_{i=0}^{n+1}\binom{n+1}{i}\left(-\dfrac{r-d}{r}\right)^{n+1-i} B_{\left(\frac{x_0}{r}\right)^2}\left(\dfrac{m+1}{2}, \dfrac{i+2}{2}\right)}{n+1} & (n: \text{even}) \end{cases}$$

Figure 22:
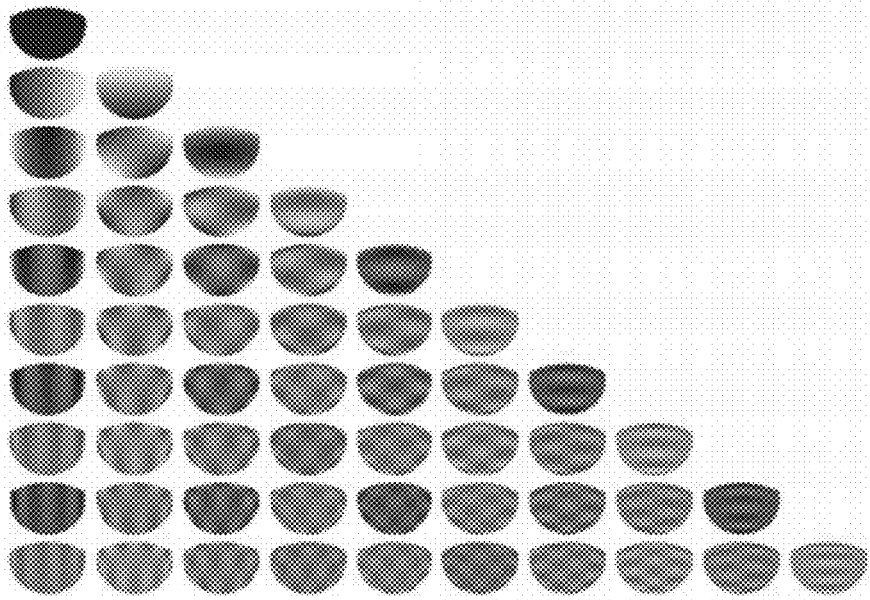
FIG. 22 shows a basis graph table (a y-coordinate of an intersection between small and large circles: positive) of gibbous polynomials.

FIG. 22 (d=½, r=2) shows a basis graph table of the gibbous polynomials formulated using this inner product reduction function. When d=1, the gibbous polynomials become an orthogonal polynomial sequence on a whole circle (which is the same as the extended semicircle polynomials when d=1; see FIG. 20 for a basis graph table), which is different from the Zernike polynomials.

<System Error Definition>
The gibbous polynomials and crescent polynomials are respectively formulated using the large circle intercept d and large circle radius r and undergo coordinate transformation according to the respective partial measurement regions, and linear combinations of bases are defined as first and second system errors. Eight types of the first and second system errors are to be defined when a measurement apparatus or measurement target is moved by only translation, and one type is to be defined when it is also moved by rotation.

Fourth Embodiment

An embodiment when the overall measurement region is a circle, and each partial measurement region is also a circle, which is different from the third embodiment, will be described below (see FIG. 5). Note that symbols d, r, $x_0$, and $y_0$ are the same as those in the third embodiment. Also, since the <consistency function formulation> and <system error calculation> steps do not depend on this embodiment, a description thereof will not be given.

<Lattice Formulation>
Lattices shown in FIG. 5 are formulated.
<Region Division>
The first region is a gibbous shape, and the second region is a crescent.
<Orthogonal Function Sequence Formulation>
Crescent polynomials as a sequence of polynomials which are orthogonal on a crescent and gibbous polynomials which are orthogonal on a gibbous shape when a y-coordinate ($y_0$) of an intersection between small and large circles is negative ($y_0<0$) are formulated.

The definition of the function sequence v and the formulation of the orthogonal function sequence w are the same as those in the first embodiment.

A domain is different from that in the first embodiment, and an inner product and inner product reduction function are also different accordingly.

Figure 15:
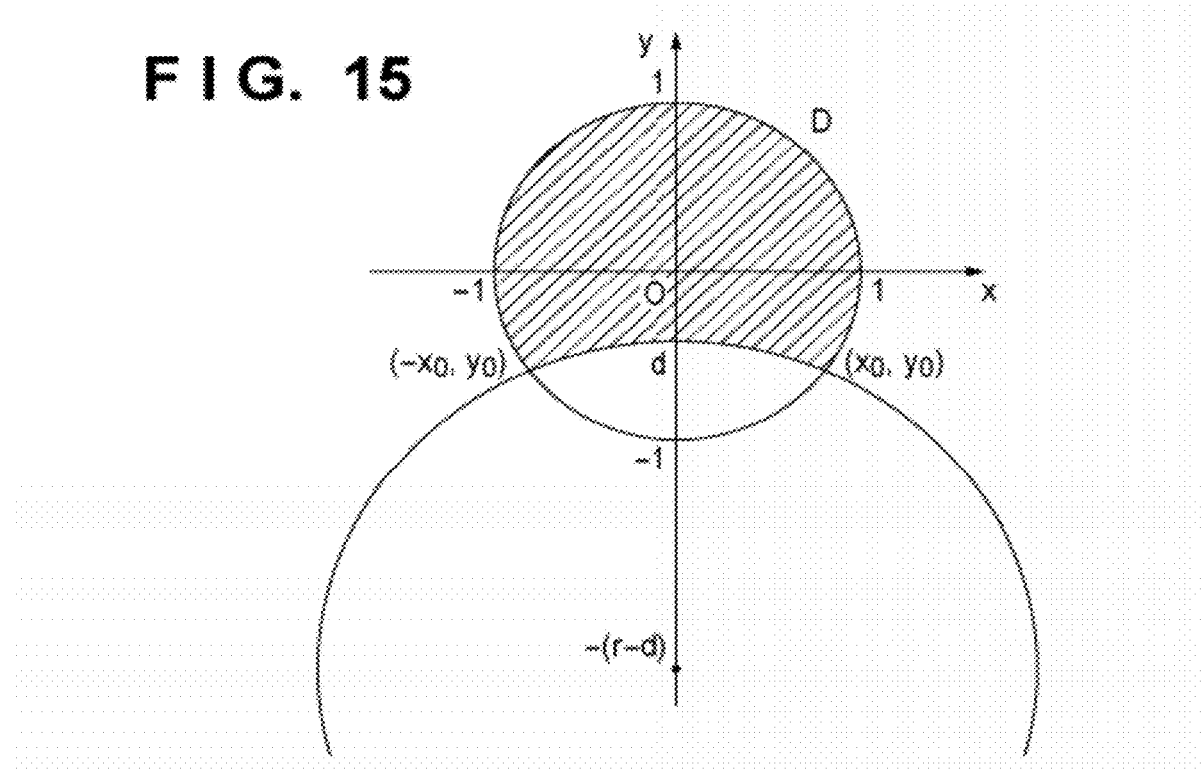
FIG. 15 shows a domain (a crescent having a negative y-coordinate of an intersection between small and large circles) of crescent polynomials.

[Crescent Polynomials]
A domain D is given by (see FIG. 15):

$$D=\{(x,y) \mid x^2+y^2<1, y>-(r-d)+\sqrt{r^2-x^2}\} \quad (36)$$

This domain is divided into the following three domains $D_1$, $D_2$ and $D_3$:

$$D_1 = \{(x, y) \mid x^2 + y^2 < 1, x < -x_0\} \quad (37)$$

$$D_2 = \{(x, y) \mid x^2 + y^2 < 1, -x_0 < x < x_0, y > -(r-d) + \sqrt{r^2 - x^2}\}$$

$$D_3 = \{(x, y) \mid x^2 + y^2 < 1, x_0 < x\}$$

An inner product is given by:

$$(p_1, p_2) = \iint_D p_1(x, y) p_2(x, y) dx dy \tag{38}$$

$$= \iint_{D_1} p_1(x, y) p_2(x, y) dx dy +$$

$$\iint_{D_2} p_1(x, y) p_2(x, y) dx dy +$$

$$\iint_{D_3} p_1(x, y) p_2(x, y) dx dy$$

$$= \int_{-1}^{-x_0} \int_{-\sqrt{1-x^2}}^{\sqrt{1-x^2}} p_1(x, y) p_2(x, y) dy dx +$$

$$\int_{-x_0}^{x_0} \int_{-(r-d)+\sqrt{r^2-x^2}}^{\sqrt{1-x^2}} p_1(x, y) p_2(x, y) dy dx +$$

$$\int_{x_0}^{1} \int_{-\sqrt{1-x^2}}^{\sqrt{1-x^2}} p_1(x, y) p_2(x, y) dy dx$$

An inner product reduction function is given by:

$$f(m, n, d, r) = \iint_D x^m y^n dx dy \tag{39}$$

$$= \iint_{D_1} x^m y^n dx dy + \iint_{D_2} x^m y^n dx dy +$$

$$\iint_{D_3} x^m y^n dx dy$$

$$= \int_{-1}^{-x_0} x^m \int_{-\sqrt{1-x^2}}^{\sqrt{1-x^2}} y^n dy dx +$$

$$\int_{-x_0}^{x_0} x^m \int_{-(r-d)+\sqrt{r^2-x^2}}^{\sqrt{1-x^2}} y^n dy dx +$$

$$\int_{x_0}^{1} x^m \int_{-\sqrt{1-x^2}}^{\sqrt{1-x^2}} y^n dy dx$$

Figure 23:
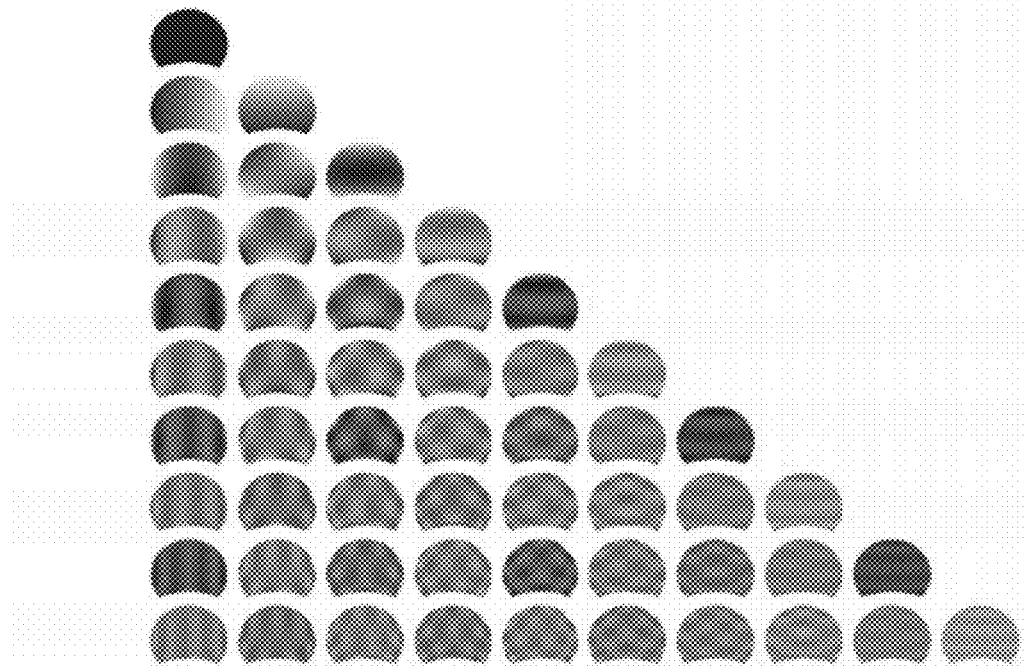
FIG. 23 shows a basis graph table (a y-coordinate of an intersection between small and large circles: negative) of crescent polynomials.

When this function is calculated, we have:

FIG. 23 ($d=-\frac{1}{2}$, $r=2$) shows a basis graph table of the crescent polynomials formulated using this inner product reduction function. When $d=-1$, the crescent polynomials become an orthogonal polynomial sequence on a whole circle (which is the same as the extended semicircle polynomials when $d=1$ and the gibbous polynomials when $d=1$; see FIG. 20 for a basis graph table), which is different from the Zernike polynomials.

[Gibbous Polynomials]

Figure 16:
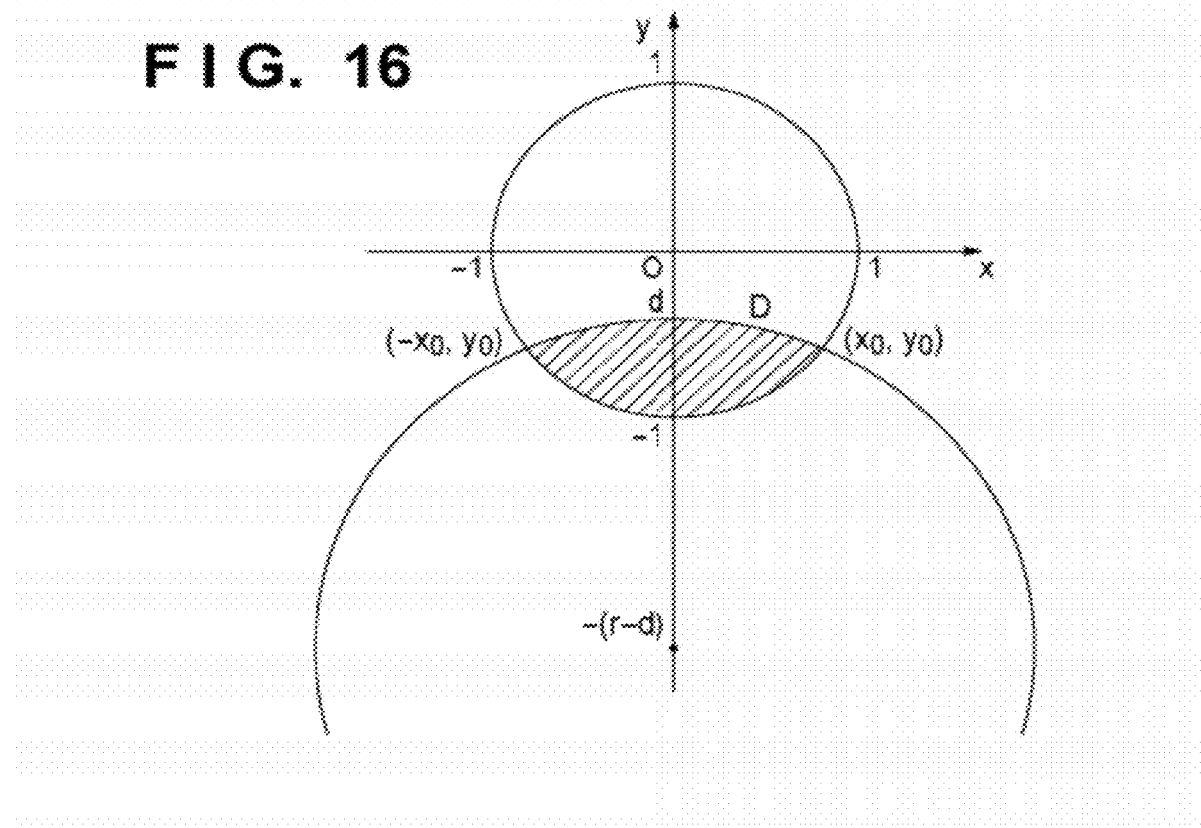
FIG. 16 shows a domain (a gibbous shape having a negative y-coordinate of an intersection between small and large circles) of gibbous polynomials.

A domain D is given by (see FIG. 16):

$$D = \{(x,y) | x^2 + y^2 < 1, y > -(r-d) + \sqrt{r^2 - x^2}\} \tag{41}$$

An inner product is given by:

$$(p_1, p_2) = \iint_D p_1(x, y) p_2(x, y) dx dy \tag{42}$$

$$= \int_{-x_0}^{x_0} \int_{-\sqrt{1-x^2}}^{-(r-d)+\sqrt{r^2-x^2}} p_1(x, y) p_2(x, y) dy dx$$

An inner product reduction function is given by:

$$f(m, n, d, r) = \iint_D x^m y^n dx dy \tag{43}$$

$$= \int_{-x_0}^{x_0} x^m \int_{-\sqrt{1-x^2}}^{-(r-d)+\sqrt{r^2-x^2}} y^n dy dx$$

$$f(m, n, d, r) = \begin{cases} 0 & (m : \text{odd}) \\ \dfrac{B_{x_0^2}\left(\dfrac{m+1}{2}, \dfrac{n+3}{2}\right) - r^{m+n+2} \sum_{i=0}^{n+1} \binom{n+1}{i} \left(-\dfrac{r-d}{r}\right)^{n+1-i} B_{\left(\frac{x_0}{r}\right)^2}\left(\dfrac{m+1}{2}, \dfrac{i+2}{2}\right)}{n+1} & (n : \text{odd}) \\ \dfrac{2B\left(\dfrac{m+1}{2}, \dfrac{n+3}{2}\right) - B_{x_0^2}\left(\dfrac{m+1}{2}, \dfrac{n+3}{2}\right) - r^{m+n+2} \sum_{i=0}^{n+1} \binom{n+1}{i} \left(-\dfrac{r-d}{r}\right)^{n+1-i} B_{\left(\frac{x_0}{r}\right)^2}\left(\dfrac{m+1}{2}, \dfrac{i+2}{2}\right)}{n+1} & (n : \text{even}) \end{cases} \quad (m : \text{even}) \tag{40}$$

When this function is calculated, we have:

$$f(m, n, d, r) = \begin{cases} 0 & (m:\text{odd}) \\ \dfrac{(-1)^n B_{x_0^2}\left(\dfrac{m+1}{2}, \dfrac{n+3}{2}\right) + r^{m+n+2} \sum_{i=0}^{n+1} \binom{n+1}{i}\left(-\dfrac{r-d}{r}\right)^{n+1-i} B_{\left(\frac{x_0}{r}\right)^2}\left(\dfrac{m+1}{2}, \dfrac{i+2}{2}\right)}{n+1} & (m:\text{even}) \end{cases} \quad (44)$$

Figure 24:
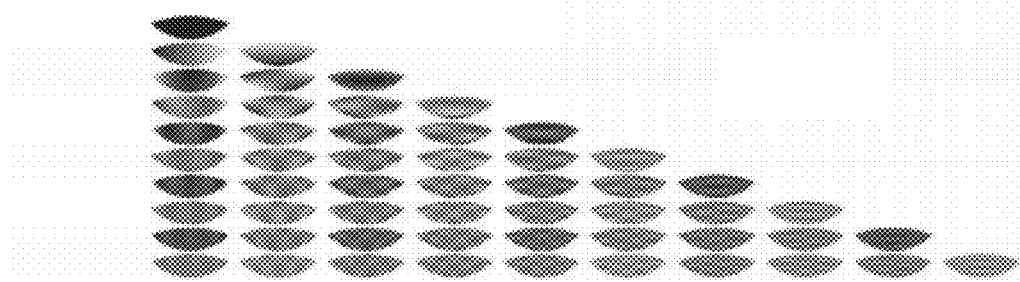
FIG. 24 shows a basis graph table (a y-coordinate of an intersection between small and large circles: negative) of gibbous polynomials.

FIG. 24 ($d=-\frac{1}{2}$, $r=2$) shows a basis graph table of the gibbous polynomials formulated using this inner product reduction function.

<System Error Definition>

The gibbous polynomials and crescent polynomials are respectively formulated using the large circle intercept d and large circle radius r and undergo coordinate transformation according to the respective partial measurement regions, and linear combinations of bases are defined as first and second system errors. Twelve types of the first and second system errors are to be defined when a measurement apparatus or measurement target is moved by only translation, and one type is to be defined when it is also moved by rotation.

Fifth Embodiment

An embodiment when the overall measurement region is a square and each partial measurement region is a circle, as a special case when the overall measurement region is a rectangle and each partial measurement region is a circle (see FIG. 2), as described in the first embodiment, will be described below (see FIG. 6). In case of these lattices, since only the first regions cover the overall measurement region, the need for defining linear combinations of respective functions of the second orthogonal function sequences as the second system errors on the second regions can be obviated.

Sixth Embodiment

An embodiment when the overall measurement region is a rectangle and each partial measurement region is a circle, which is different from the first, second, and fifth embodiments, will be described below (see FIG. 7). In case of these lattices, since only the first regions cover the overall measurement region, the need for linear combinations of respective functions of the second orthogonal function sequences as the second system errors on the second regions can be obviated as in the fifth embodiment. Unlike in the fifth embodiment, the first regions on the respective partial measurement regions are not congruent. Since there are two types of the first regions, that is, a semicircle and reduced semicircle, two types of the first orthogonal function sequences are also formulated (in the extended semicircle polynomials, d=0: a semicircle, d<0: a reduced semicircle).

Seventh Embodiment

An embodiment when the overall measurement region is a circle, and each partial measurement region is a rectangle will be described below (see FIG. 8). In case of these lattices, when a specific region is not extracted in advance from each partial measurement region (partial measurement region: a broken line rectangle), the first region is an enlarged semicircle; when a specific region is extracted in advance from each partial measurement region (partial measurement region: a solid line rectangle), the first region is a semicircle. When a specific region is extracted in advance from each partial measurement region, the following effects are obtained.

Formulation of the orthogonal function sequence can be facilitated (formulation of the semicircle polynomials is easier than that of the extended semicircle polynomials).

The formulated orthogonal function sequence becomes simple (the semicircle polynomials are simpler than the extended semicircle polynomials).

Eighth Embodiment

An embodiment in which after first and second system errors are calculated, they are combined by linear combinations of respective functions of orthogonal function sequences on partial measurement regions will be described below. A case will be examined below wherein one type of each of the first and second system errors is to be defined in the first to fourth embodiments. In this case, each partial measurement region is circular, and system errors exist on the circle. System errors are calculated by combining the calculated first and second system errors. By expressing the system errors by fitting using the Zernike polynomials as an orthogonal function sequence on a circle or the extended semicircle polynomials when d=1, the following effects are obtained.

Components (coefficients of bases) of the system errors can be detected.

Steps between the first and second system errors generated on a boundary between the first and second regions can be reduced.

Ninth Embodiment

Figure 25:
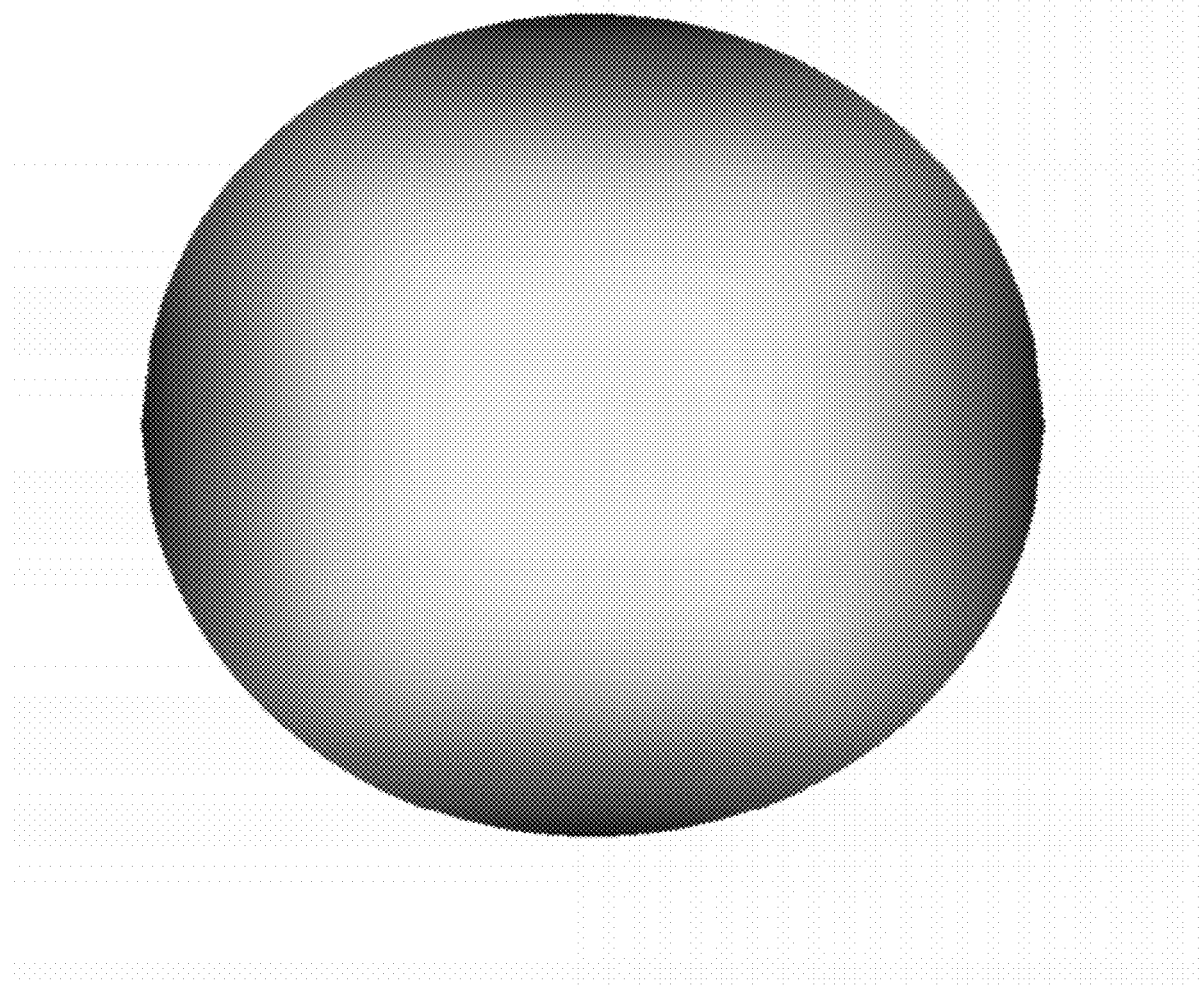
FIG. 25 shows a fitting target shape.
Figure 26:
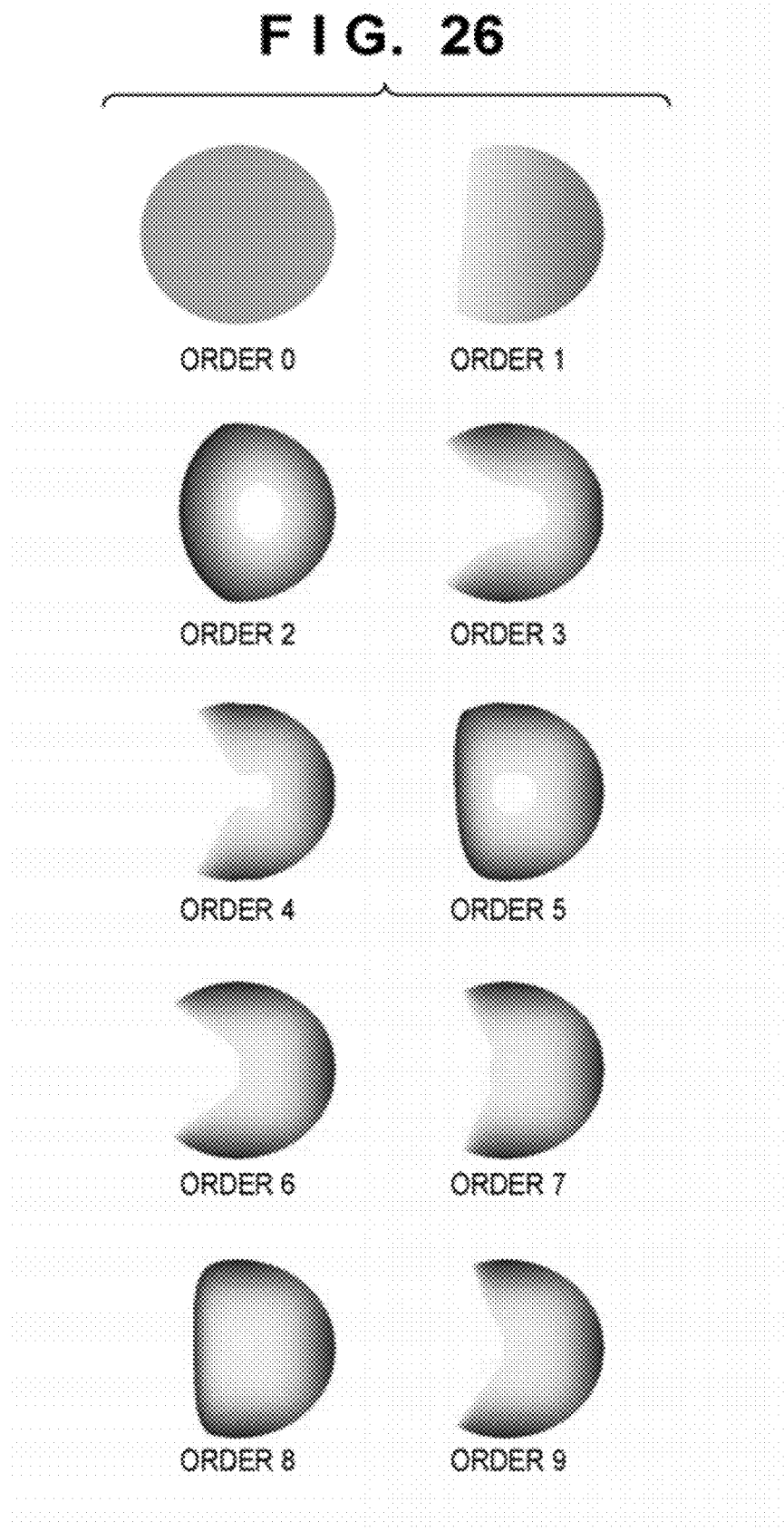
FIG. 26 shows Zernike polynomial fitting shapes.
Figure 27:
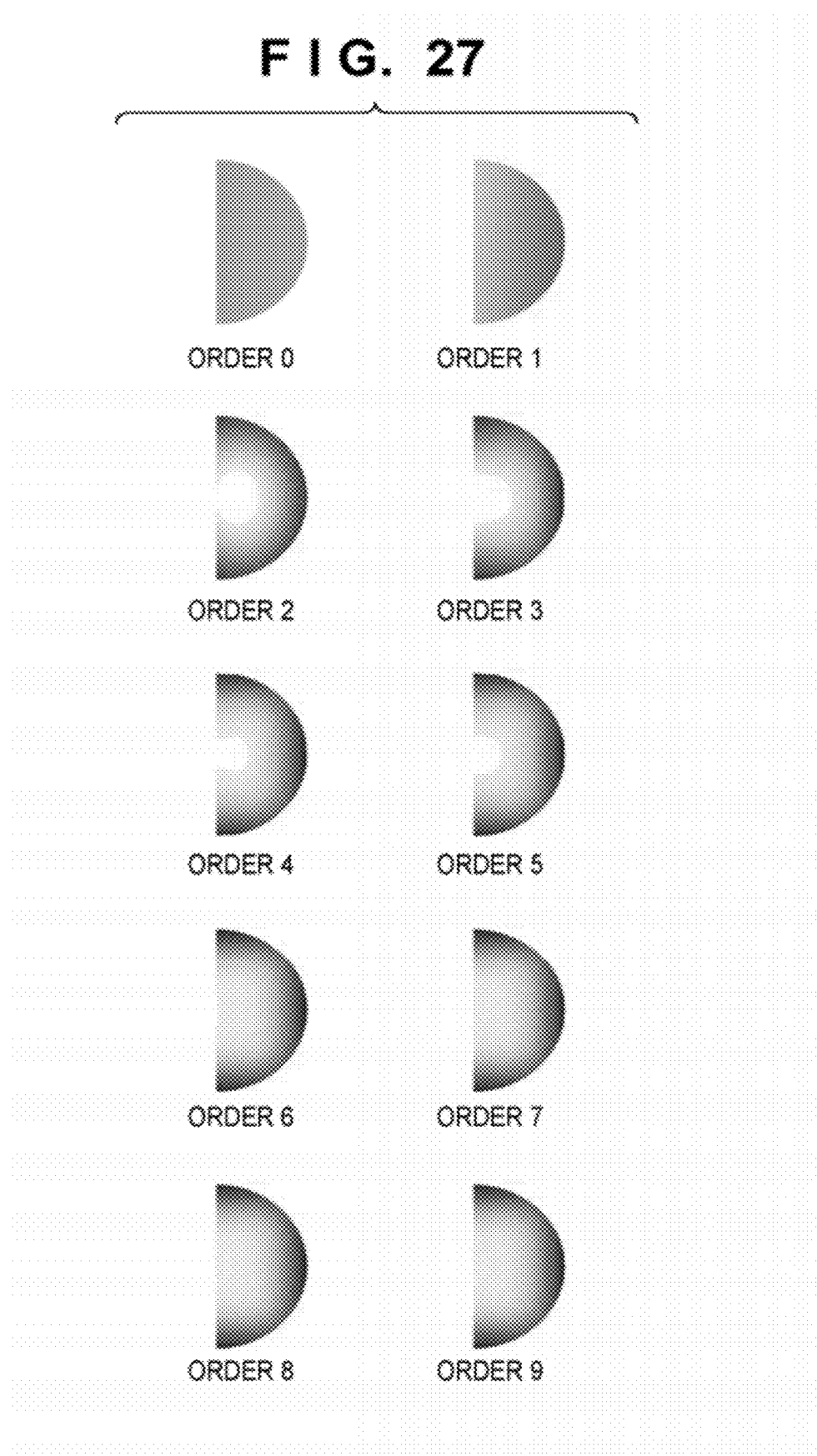
FIG. 27 shows semicircle polynomial fitting shapes.

An embodiment of comparison when the system error definition uses the Zernike polynomials and when it uses the semicircle polynomials in the case in which the overall measurement region is a rectangle and each partial measurement region is a circle (see FIG. 2) described in the first embodiment will be described below. As the contents, peripheral partial measurement data are simulated, so that data exist on only a semicircle (D in FIG. 10) of a circular partial measurement region. Using the data, fitting is executed respectively in the Zernike polynomials and semicircle polynomials. Setting items include a target shape, a sampling interval at the time of creation of shape data, and orders of polynomials at the time of execution of fitting. Evaluation items include a shape on a domain of polynomials obtained by fitting, and coefficients of bases of polynomials obtained by fitting. These items are as follows:

Setting Items
Target Shape
$z = e^{-(x^4 + y^4)}$ (see FIG. 25)
Sampling Interval
$\Delta x = 0.1$, $\Delta y = 0.1$
Orders of Polynomials order 0, order 1, . . . , order 9
Evaluation Items
Shape
Zernike polynomials: FIG. 26, semicircle polynomials: FIG. 27
Coefficients
Zernike polynomials: FIG. 28, semicircle polynomials: FIG. 29

As for the shape, as can be seen from FIG. 26, fitting using the Zernike polynomials can be executed well in a data existence region of the domain, but it cannot be executed well in a non-data existence region. Note that a point which assumes a value outside a codomain of the shape is not plotted. On the other hand, as can be seen from FIG. 27, fitting using the semicircle polynomials can be executed well in a data existence region as the domain.

As for the coefficients, as can be seen from FIG. 28, fitting using the Zernike polynomials has different coefficients of bases depending on orders. On the other hand, as can be seen from FIG. 29, fitting using the semicircle polynomials has the same coefficients of bases independently of orders.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2011-014381 filed on Jan. 26, 2011, which is hereby incorporated by reference herein in its entirety.

What is claimed is:

1. A stitch measurement method of obtaining an overall shape of an overall measurement region a surface to be detected by combining partial measurement results of a plurality of partial measurement regions that encompass the overall measurement region, the method being executed by a processor and comprising:
a step of measuring shapes of the plurality of partial measurement regions in the overall measurement region of the surface to be detected;
a step of dividing each peripheral partial measurement region including an external portion of the overall measurement region into a first region inside the overall measurement region and a second region outside the overall measurement region, and dividing each central partial measurement region that does not include any external portion of the overall measurement region into a first region and a second region according to division patterns of the peripheral partial measurement region;
a step of formulating first orthogonal function sequences on the first regions;
a step of defining linear combinations of respective functions of the first orthogonal function sequences on the first regions as first system errors for the respective partial measurement regions on the overall measurement region;
a step of formulating a consistency function including coefficients in the linear combinations as variables;
a step of calculating system errors from variables decided by optimizing the consistency function; and
a step of obtaining the overall shape of the overall measurement region using the calculated system errors and the measured shapes of the plurality of partial measurement regions.

2. The method according to claim 1, further comprising:
a step of formulating second orthogonal function sequences on the second regions; and
a step of defining linear combinations of respective functions of the second orthogonal function sequences on the second regions as second system errors for the respective partial measurement regions on the overall measurement region.

3. The method according to claim 2, wherein in the step of formulating the first orthogonal function sequences on the first regions or in the step of formulating the second orthogonal function sequences on the second regions, Gram-Schmidt orthogonalization is used.

4. The method according to claim 2, wherein after the first system errors and the second system errors are calculated, first system errors and the second system errors are combined by linear combinations of respective functions of orthogonal function sequences on the partial measurement regions.

5. The method according to claim 4, wherein an orthogonal function sequence on each partial measurement region includes Zernike polynomials.

6. The method according to claim 1, wherein lattices on which the first regions on the respective partial measurement regions are congruent are formulated.

7. The method according to claim 1, wherein a specific region is extracted in advance from each partial measurement region.

* * * * *